United States Patent
Gelman

(10) Patent No.: US 11,611,485 B1
(45) Date of Patent: Mar. 21, 2023

(54) SHARED RISK LINK GROUP-DISJOINT ROUTING IN DATA COMMUNICATION NETWORKS

(71) Applicant: ECI Telecom Ltd., Petah Tikva (IL)

(72) Inventor: Efraim Gelman, Ramat Gan (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

(21) Appl. No.: 17/685,995

(22) Filed: Mar. 3, 2022

(51) Int. Cl.
*H04L 41/12* (2022.01)

(52) U.S. Cl.
CPC .................................. *H04L 41/12* (2013.01)

(58) Field of Classification Search
CPC ......... H04L 41/12; H04L 45/22; H04L 45/28; H04L 41/0654–0672; H04L 41/154; H04L 45/128–1287
See application file for complete search history.

(56) References Cited

U.S. PATENT DOCUMENTS

| | | | |
|---|---|---|---|
| 2004/0205237 A1* | 10/2004 | Doshi | H04L 41/0668 709/241 |
| 2005/0237950 A1* | 10/2005 | Yuan | H04J 14/0227 370/255 |
| 2018/0063608 A1* | 3/2018 | Prakash | H04L 45/122 |

* cited by examiner

*Primary Examiner* — Maharishi V Khirodhar
*Assistant Examiner* — Kenneth P Hunt
(74) *Attorney, Agent, or Firm* — Finnegan, Henderson, Farabow, Garrett & Dunner, LLP

(57) ABSTRACT

Systems and methods are disclosed for determining shared risk link group (SRLG) disjoint paths in a communications network. An original graph representing the communications network can be obtained. The original graph can include vertices and edges corresponding to nodes and communication links in the communication network. The vertices can include a source vertex and a target vertex and each edge can be associated with a set of SRLGs A reduced graph can be generated from the original graph. Generation of the reduced graph can include identification of a first edge of the edges as a dominating edge and removal of the first edge. Two SRLG-disjoint paths can then be identified on the reduced graph.

20 Claims, 17 Drawing Sheets

SHARED RISK LINK GROUP-DISJOINT ROUTING IN DATA COMMUNICATION NETWORKS

TECHNICAL FIELD

The present disclosure relates to the field of data communication networks and, more particularly, to systems and methods for routing in a data communication network.

BACKGROUND

A communications network can include nodes connected by communication links. A communication channel between two nodes can use one or more communication links. If a communication link on the path fails, the communications channel can be disrupted. Backup routes can be associated with the communication channel, allowing rapid recovery of the communication channel following failure of a link. However, communications link failures may not be uncorrelated. A group of communications links can be subject to a common risk, such that failures for communications links in that group are correlated. Such a group can be referred to as a Shared Risk Link Group (or SRLG). Such correlations can arise from the physical architecture of the network. For example, multiple optical fibers can be bundled into a single conduit. An event that severs one optical fiber in that conduit will likely sever all optical fibers in that conduit. A single communications link can be associated with multiple SRLGs.

When an active route and a backup route are both associated with a particular SRLG, the active route and the backup route can suffer from a common failure. Thus the communications channel may be less resilient to link failure than the presence of the backup route would suggest. To increase the resilience of a communications channel, the communications links in the active route and the communications in the backup route can be selected to share no SRLGs (e.g., they can be SRLG-disjoint). However, selecting routes that satisfy this condition is an NP hard problem and cannot be solved in polynomial time.

Accordingly, approximate solutions that enable determination of SRLG-disjoint paths in large communications networks are needed.

SUMMARY

The disclosed embodiments generate a reduced graph from an original graph representing a communications network by identifying and removing dominating edges in the original graph. Whether an edge is a dominating edge in a graph can depend on a source and target vertex in the graph and on the sets of SRLGs associated with the edges in the graph.

The disclosed embodiments include a non-transitory, computer-readable medium. The non-transitory, computer-readable medium can contain instructions that, when executed by at least one processor of a system, cause the system to perform operations for determining SRLG-disjoint paths. The operations can include obtaining an original graph representing a communications network. The original graph can include vertices corresponding to nodes in the communication network and edges corresponding to communication links in the communications network. The vertices can include a source vertex and a target vertex and each edge can be associated with a set of SRLGs (SRLG sets). The operations can further include generating a reduced graph from the original graph. Such generation can include identifying a first edge of the edges as a dominating edge and removing the first edge. The operations can further include identifying two SRLG-disjoint paths on the reduced graph and providing instructions to configure the communications network according to the identified two SRLG-disjoint paths.

The disclosed embodiments include a method for determining shared risk link group (SRLG) disjoint paths. The method can include operations. The operations can include obtaining a graph representing a communications network. The graph can include vertices corresponding to nodes in the communication network and edges corresponding to communication links in the communication network. The vertices can include a source vertex and a target vertex and each edge can be associated with an SRLG set. The operations can include iteratively removing edges from the graph. An iteration can include identifying a first edge of the edges as a dominating edge, and removing the first edge. The operations can include identifying two SRLG-disjoint paths on the graph and providing instructions to configure the communication network according to the identified two SRLG-disjoint paths.

The disclosed embodiments include a system. The system includes at least one processor and at least one non-transitory, computer-readable medium. The non-transitory, computer-readable medium contains instructions that, when executed by at least one processor of the system, cause the system to perform operations for determining shared risk link group (SRLG) disjoint paths. The operations can include obtaining an original graph representing a communications network. The original graph can include vertices corresponding to nodes in the communication network and edges corresponding to communication links in the communications network. The vertices can include a source vertex and a target vertex and each edge can be associated with an SRLG set. The operations can include generating a reduced graph from the original graph. Such generation can include identifying a first edge of the edges as a dominating edge, the first edge associated with a first SRLG set, and removing the first edge. The operations can further include identifying two SRLG-disjoint paths on the reduced graph and providing instructions to configure the communications network according to the identified two SRLG-disjoint paths.

The disclosed embodiments include another method for determining shared risk link group (SRLG) disjoint paths. The method can include operations. The operations can include generating a reduced graph from an original graph of a communication network.

The original graph can include vertices corresponding to nodes in the communication network and edges corresponding to communication links in the network. The original graph can include a source vertex, a target vertex, and N intermediate vertices connected by N intermediate edges to the source vertex.

For a $k^{th}$ intermediate vertex, for k between 1 and N, an edge connecting the $k^{th}$ intermediate vertex with the source vertex can be associated with shared risk link groups $2k-1$ and $2k$; an edge connecting the $k^{th}$ intermediate vertex with a $2k-1^{th}$ subnetwork can be associated with shared risk link groups $2m+1$, for m from k to N, a link connecting the $2k-1^{th}$ subnetwork with the target vertex being associated with the same shared risk link groups as the edge connecting the $k^{th}$ intermediate vertex with the $2k-1$ th subnetwork; and a $k^{th}$ intermediate edge connecting the $k^{th}$ intermediate vertex with a $2k^{th}$ subnetwork is associated with shared risk link groups $2m$, for m from k to N, an edge connecting the $2k^{th}$ subnetwork with the target vertex being associated with the same shared risk link groups as the edge connecting the $k^{th}$ intermediate vertex with the $2k^{th}$ subnetwork.

The original graph can further include an even vertex connected by a first edge to the source vertex and a second edge to the target vertex. The first edge can be associated with shared risk link groups 2j, for j from 1 to N. The second edge can be associated with the same shared risk link groups as the first edge.

The original graph can further include an odd vertex connected by a third edge to the source vertex and a fourth edge to the target vertex. The third edge can be associated with shared risk link groups 2j+1, for j from 0 to N. The fourth edge can be associated with the same shared risk link groups as the third edge.

Generating the reduced graph from the original graph can include iteratively discarding the intermediate edges.

The operations can further include identifying as a first SRLG-disjoint path the first edge and second edge; identifying as a second SRLG-disjoint path the third edge and fourth edge; and providing instructions to configure the network according to the identified first SRLG-disjoint path and second SRLG-disjoint path.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
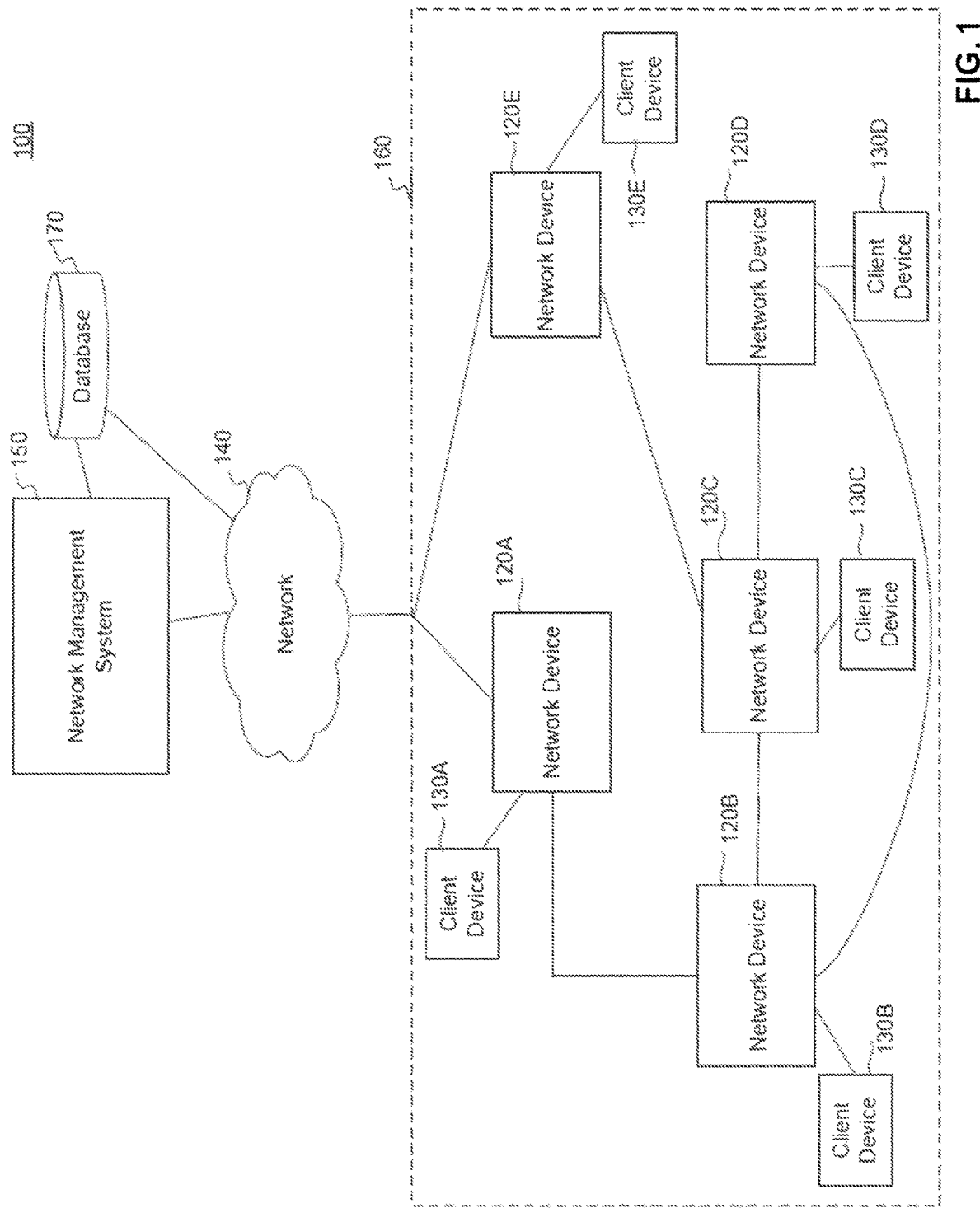
FIG. 1 depicts an exemplary data communication network in which various implementations as described herein may be practiced.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

A communication network can include network nodes (e.g., clients, servers, microservices, virtual machines, serverless code instances, IoT devices, etc.) configured to communicate with one another using communication links. The disclosed embodiments are not limited to any particular communication link implementation or physical medium. The communication links can include wired or wireless communication links. Wired communication links can include optical links, electrical communication links, or other suitable links. Wireless communication links can include microwave, radio wave, optical links, or other suitable wireless links. Communications between network nodes can be implemented using communications protocols. The disclosed embodiments are not limited to any particular communication protocol. Communication protocols can include cellular communication protocols (e.g., 3G, 4G, 5G, or the like), IEEE 802 or IEEE 802-based protocols (e.g., Ethernet, WiFi, Zigbee or the like), Digital subscriber line (DSL), Plain old telephone service (POTS), or other suitable protocols.

Communication link failures can be correlated. Such correlations can arise from the physical structure of the communications links. For example, multiple optical fiber communications cables may be bundled into a single conduit or onto a single aerial. As an additional example, multiple wireless communications links can be transmitted and received using transmitters on the same tower. In these examples, an event that affects the conduit, aerial, or tower could cause all the corresponding communications links to fail. For example, a backhoe could sever all the fiber optic cables in the conduit, or atmospheric conditions could affect all the transmitters on the tower.

Communication links likely to suffer correlated failures can be grouped into a shared risk link group (SRLG). The disclosed embodiments are not limited to any particular manner of identifying such a grouping. In some embodiments, the grouping can depend on a common physical characteristic of the grouped communication links (e.g., the communication links are bundled into a common conduit). In various embodiments, the grouping can depend on a statistical analysis of historical failures. Such grouping can be performed manually, semi-manually, or automatically.

A communication network can be configured to satisfy demands. As used herein, a demand can be a request to communicate (or establish a communication channel, or the like) between a source node and a target node in the network. In some embodiments, a demand can specify a source node and a target node. In various embodiments, one or more of the source node and target node can be implicit or determined by the communication network in response to the demand. Satisfaction of a demand may require identification of multiple, SRLG-disjoint network paths (e.g., an active path and one or more backup paths) connecting the source node and the target node. In some implementations, the multiple, SRLG-disjoint network paths may preferably include a minimum number of communication links, or include a reduced number of communication links, as compared to SRLG-disjoint network paths identified using conventional approaches.

Conventional approaches to identifying SRLG-disjoint network paths include integer linear programming approaches, heuristic approaches, or the like. Integer linear programming approaches formulate identification of the SRLG-disjoint network paths as an integer linear programming problem, which can then be solved using an ILP solvers (e.g., Cplex, CBC, Garubi, or the like). Heuristic approaches can include approaches based on searching the set of all paths between a source and target vertex for suitable paths. For example, a path may be selected and all SRLGs associated with that path identified. All edges associated with any of the identified SRLGs can be removed from the graph. The resulting graph can be searched for a path from the source vertex to the target vertex using a path-finding algorithm (e.g., Dijkstra, a breadth-first or depth-first pathfinding algorithm, or another suitable algorithm).

Typical real-world communications networks can include hundreds of nodes connected by thousands of links. On such large and complex networks, ILP solvers may not converge to a solution or may have a long running time. Heuristic approaches based on searching the set of all paths between a source and target vertex may be unfeasible, as this set can grow exponentially in size with the number of nodes or links. And a search restricted to a subset of the set of all paths may miss a solution. Accordingly, conventional approaches can be unsuitable for identifying SRLG-disjoint network paths in typical real-world communications networks.

The disclosed systems and methods address these technical problems by identifying dominating edges within in a graph representing a communications network. A dominating edge can be an edge that, when included in a path between a source vertex and a target vertex, precludes generation of another SRLG-disjoint path between that source vertex and target vertex. More formally, a graph can include vertices V that are connected by edges E. The edges E can be associated with SRLGs S. A mapping $M(e \in E) = s \subseteq S$ can define the SRLGs associated with each edge in the graph. An edge $e \in E$ can be a dominating edge when removing all the edges $e' \in E$, where $M(e) \cap M(e') \neq 0$, disconnects the source vertex from the target vertex. Because a dominating edge cannot be included in an SRLG-disjoint path, a dominating edge can be removed from the graph prior to attempting to identify such paths. Whether an edge is a dominating edge can depend on the other edges present in the graph. Removal of one dominating edge can cause other edges to become dominating edges. Once a sufficient number of the dominating edges (or all the dominating edges) have been removed from the graph, a conventional approach can be applied to the reduced graph to identify SRLG-disjoint network paths.

The disclosed embodiments have been validated on real-world communications networks. When a process consistent with disclosed embodiments was used to identify and remove dominant edges from a real-world network, 44 of 45 demands on that network could be addressed without using an ILP solver. For these 44 demands, the process enabled either 1) identification of two SRLG-disjoint paths using simple heuristics, or 2) a determination that no SRLG-disjoint paths existed. When a process consistent with disclosed embodiments was used to identify and remove dominant edges from exemplary network including 264 vertices and 504 edges, an ILP solver applied to the reduced network (e.g., the exemplary network with the dominating edges removed) was able to identify SRLG-disjoint paths in less than a millisecond. In contrast, when applied to the exemplary network, the ILP solver failed on a timeout exception.

FIG. 1 depicts an exemplary communication network 100 in which various implementations as described herein may be practiced. Communication network 100 includes, for example, a network 140, network management system 150, database 170, nodes 120A-120E, and client devices 130A-130E. Nodes 120A-120E and client devices 130A-130E form a service network 160, in which the nodes 120A-120E (collectively nodes 120) provide data services to client devices 130A-130E (collectively 130). The nodes can include hardware-based or software-based switches, routers, splitters, or the like that facilitate delivery of data services to client devices 130. The components and arrangements shown in FIG. 1 are not intended to limit the disclosed embodiments, as the system components used to implement the disclosed processes and features can vary. For example, each of nodes 120 may be associated with no, one, or many client devices 130. In various embodiments, service network 160 may be based on one or more of on-premises network environments, virtualized (cloud) network environments, or combinations of on-premises and cloud networks. Consistent with embodiments described herein, various types of data may be communicated over service network 160, such as Internet (e.g., IP protocol) data, telephony or telecommunications data, satellite data, IoT-based data, cellular data, proprietary network data, and more.

Network management system 150 can be a computer-based system including computer system components, desktop computers, workstations, tablets, handheld computing devices, memory devices, and/or internal network(s) connecting the components. Network management system 150 can be configured to manage service deliveries for the service network 160. For example, the network management system 150 may determine network paths and allocate resources for demands in the communication network 100. The network management system 150 may determine a set of SRLG-disjoint network paths that satisfy a plurality of demands on communication network 100.

Network 140 can facilitate communication between the network management system 150 and the service network 160. Network management system 150 may send data to nodes 120 via network 140 to allocate resources for demands in the communication network 100. Network management system 150 may also receive data from nodes 120 via network 140 indicating the status of communication links in the communication network 100. Network 140 may be an electronic network. Nodes 120 may be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly-accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long-Term Evolution (LTE) network or a Personal Communication Service (PCS) network, that allow mobile devices (e.g., client devices 130) to send and receive data via applicable communication protocols, including those described above.

In the illustrated example, nodes 120A and 120E are directly connected to network 140, and nodes 120B-120D connect to the network 140 via their connection to nodes 120A and/or 120E. Nodes 120B-120D may also directly connect to the network 140, or may indirectly connect to the network 140 through numerous other devices. Nodes 120 may be connected to one another via copper wire, coaxial cable, optical fiber, microwave links, or other satellite or radio communication components. Accordingly, nodes 120 may each have a corresponding communications interface (e.g., wireless transceiver, wired transceiver, adapter, etc.) to allow for such communications.

As shown in FIG. 1, nodes 120A-120E are connected to one another. In this example, node 120A is connected to node 120B, node 120B is connected to node 120A, 120C, and 120D, node 120C is connected to node 120B, 120D, and 120E, node 120D is connected to nodes 120B and 120C, and node 120E is connected to node 120C. In some embodiments, the network management system 150 may obtain the connectivity status between the network devices and generate a representation (e.g., a graph) of the connectivity of the network. In various embodiments, the network management system 150 can acquire the network topology from a server or a database associated with a service provider providing the service network 160. As may be appreciated, the service network 160 illustrated in FIG. 1 is not intended to be limiting. The disclosed embodiments include other service network configurations and topologies.

Network management system 150 can be implemented using one or more computing device (e.g., a node of node 120, a mobile device, laptop, desktop, workstation, server, computing cluster or cloud computing platform, or the like). Network management system 150 can be implemented as a distributed system over multiple computing devices. The disclosed embodiments are not limited to any particular implementation of network management system 150.

Database 170 can include one or more physical or virtual storages coupled with the network management system 150. Database 170 may be configured to store information associated with the service network 160, such as a network topology, the capabilities of the nodes 120, the demands and corresponding configurations provided by the service network 160, and so on. Database 170 may also be adapted to store processed information associated with the network topology and demands in the service network 160, so as to facilitate efficient route configurations and resource allocations to satisfy the demands in the service network 160. The data stored in the database 170 may be transmitted to the network management system 150 and/or the nodes 120. In some embodiments, the database 170 can be stored in a cloud-based server (not shown) accessible to the network management system 150 and/or the nodes 120 through the network 140. While the database 170 is illustrated as an external device connected to the network management system 150, the database 170 may also reside within the network management system 150 as an internal component of the network management system 150.

As shown in FIG. 1, nodes 120A-120E can be connected with client devices 130A-130E respectively to service demands. As an example, client devices 130A-130E may include a display such as a television, tablet, computer monitor, video conferencing console, IoT device, or laptop computer screen. Client devices 130A-130E may also include video/audio input devices such as a video camera, web camera, or the like. As another example, client devices 130A-130E may include mobile devices such as a tablet or a smartphone having display and video/audio capture capabilities. While FIG. 1 shows one client device 130 connected to each of nodes 120, zero or more client devices 130 may be connected to a node.

In some embodiments, communication network 100 can include an optical network, where the nodes 120 are interconnected by optical fiber links. Such optical fiber links can include optical fiber links that support communication over multiple optical channels using multiple optical wavelengths. The optical network can be implemented, as least in part, using a wavelength division multiplexing (WDM) physical layer. A WDM optical signal can use a plurality of transmission channels, each channel carrying an information signal modulated over a carrier wavelength. A node can be configurable to switch a channel from an input fiber to an output fiber, or to add/drop traffic. A node can include a wavelength switch or an optical add/drop multiplexer that performs optical add, drop, and pass through. A node may include optical or optical/electrical elements configurable to perform functions including compensating, amplifying, switching, restoring, performing wavelength conversion of incoming optical signals, etc. The optical fiber links may include dispersion compensation fibers (DCF), optical filters, amplifiers, and other relevant optical components suitable for operation of optical networks. The network management system 150 or database 170 can store topologic data that includes information about optical channels and their associated wavelengths. In some embodiments, network management system 150, or another component of communication network 100, can be configured to determine routing and wavelength assignment for a given set of demands. The network management system 150, can create a channel to satisfy a demand. In some embodiments, such a channel can be characterized by a network path and an assigned wavelength number.

In some embodiments, network management system 150 can be configured to detect failures of links in communication network 100. The disclosed embodiments are not limited to any particular method or architecture for detecting the failure of links in communication network 100. The network management system 150 can be configured to identify a link failure by detecting degradation in services provided by the data communication network (e.g., services that route traffic through the affected link). Additionally or alternatively, the network management system 150 can identify the link failures using feedback received from nodes. In some embodiments, such nodes can provide indications of communication interruptions (e.g., a failure to send or receive information over a link).

Figure 2:
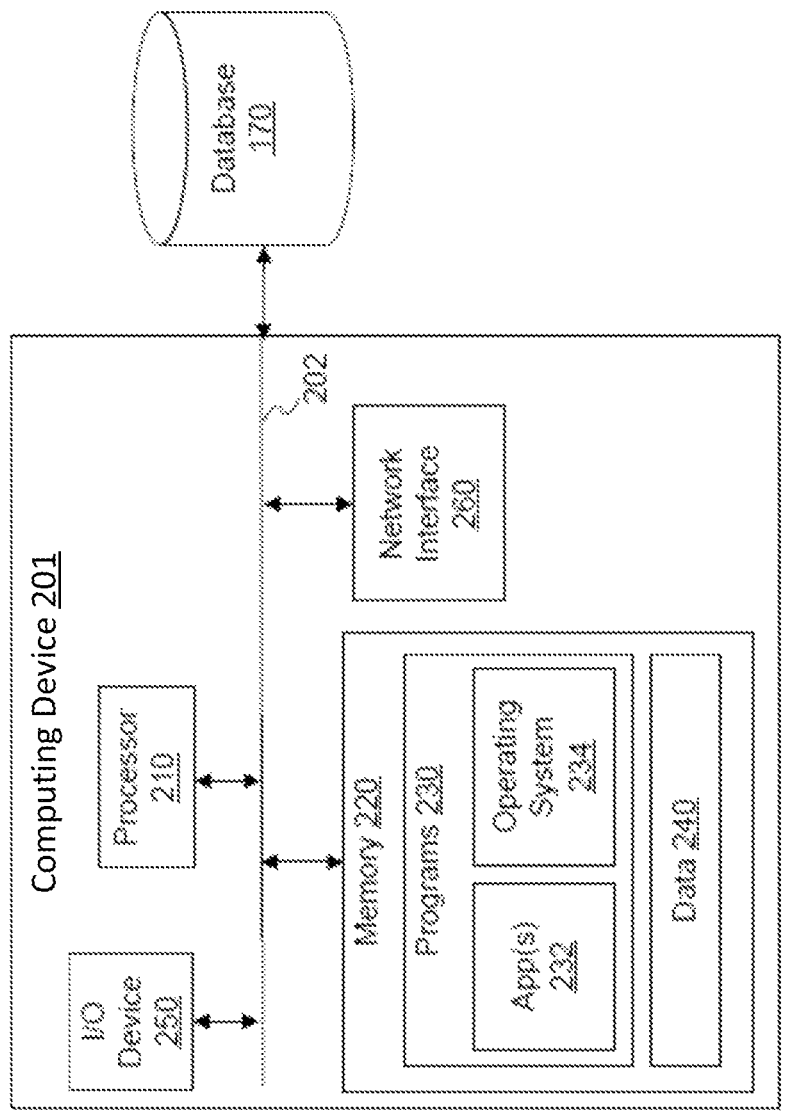
FIG. 2 depicts a diagram of an exemplary network management system, consistent with the disclosed embodiments.

FIG. 2 depicts a diagram of an exemplary computing device 201 (e.g., a mobile device, laptop, desktop, workstation, network appliance, or the like) suitable for implementing network management system 150, consistent with the disclosed embodiments. Network management system 150 can be implemented using one or more such computing devices (e.g., a single computing device, a cluster of such computing devices, a virtual computing device running on such a computing device, a cloud-computing platform implemented using such devices, or another suitable implementation). Network management system 150 can be configured, by configuring the computing device(s) implementing network management system 150, to perform systems and methods for managing a communication network, consistent with disclosed embodiments. In such a manner, network management system 150 can be configured to determine network paths for satisfying a set of demands on a network, consistent with disclosed embodiments.

The computing device 201 can include a bus 202 (or other communication mechanism) which interconnects subsystems and components for transferring information within the computing device. As shown, the computing device 201 can include one or more processors 210, input/output ("I/O") devices 250, network interface 260 (e.g., a modem, Ethernet card, or any other interface configured to exchange data with a network), and one or more memories 220 storing programs 230 including, for example, server app(s) 232, operating system 234, and data 240, and can communicate with an external database 170 (which, for some embodiments, may be included within the computing device 201).

The processor 210 can be a central processing unit (CPU), graphical processing unit (GPU), application specific integrated circuit (ASIC) of system on a chip (SoC), field programmable gate array (FPGA), or the like. The processor 210 may comprise a single core or multiple core processors executing parallel processes simultaneously. For example, the processor 210 may be a single core processor configured with virtual processing technologies. In certain embodiments, the processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the computing device 201 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Possible forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, or any other flash memory, NVRAM, a cache, a register, any other memory chip or cartridge, and networked versions of the same.

Computing device 201 may include one or more storage devices configured to store information used by processor 210 (or other components) to perform certain functions related to the disclosed embodiments. For example, computing device 201 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to computing device 201) or external storage communicatively coupled with computing device 201 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint databases, Oracle™ databases, Sybase™ databases, or other relational databases.

In some embodiments, computing device 201 may be communicatively connected to one or more remote memory devices (e.g., remote databases (not shown)) through network 140 or a different network. The remote memory devices can be configured to store information that the computing device 201 can access and/or manage. By way of example, the remote memory devices could be document management systems, Microsoft™ SQL database, SharePoint databases, Oracle™ databases, Sybase™ databases, or other relational databases. Systems and methods consistent with disclosed embodiments, however, are not limited to separate databases or even to the use of a database.

The programs 230 may include one or more software modules configured to cause processor 210 to perform one or more functions of the disclosed embodiments. Moreover, the processor 210 may execute one or more programs located remotely from one or more components of the communication network 100. For example, computing device 201 may access one or more remote programs that, when executed, perform functions related to disclosed embodiments.

In the presently described embodiment, server app(s) 232 cause the processor 210 to perform one or more functions of the disclosed methods. For example, the server app(s) 232 cause the processor 210 to determine service routes and allocate resources for services to be delivered in the communication network 100.

In some embodiments, the program(s) 230 may include the operating system 234 performing operating system functions when executed by one or more processors such as the processor 210. By way of example, the operating system 234 may include Microsoft Windows™, Unix™, Linux™, Apple™ operating systems, Personal Digital Assistant (PDA) type operating systems, such as Apple iOS™, Google Android™, Blackberry OS™, or other types of operating systems. Accordingly, disclosed embodiments may operate and function with computer systems running any type of operating system 234. Computing device 201 may also include software that, when executed by a processor 210, provides communications with network 140 through the network interface 260 and/or a direct connection to one or more nodes 120A-120E.

In some embodiments, the data 240 may include, for example, network configurations, requirements of service demands, service paths for satisfying the service demands and relationships between the service paths, capacity of the network devices, and so on. For example, the data 240 may include network topology of the service network 160 and operating status (e.g., operating properly or not operating properly) of the communication link between the nodes 120. The data 240 may also include requirements of service demands and service paths for each service demand in the service network 160.

Computing device 201 may also include one or more I/O devices 250 having one or more interfaces for receiving signals or input from devices and providing signals or output to one or more devices that allow data to be received and/or transmitted by the network management system 150. For example, computing device 201 may include interface components for interfacing with one or more input devices, such as one or more keyboards, mouse devices, and the like, that enable computing device 201 to receive input from an operator or administrator (not shown).

Figure 3A:
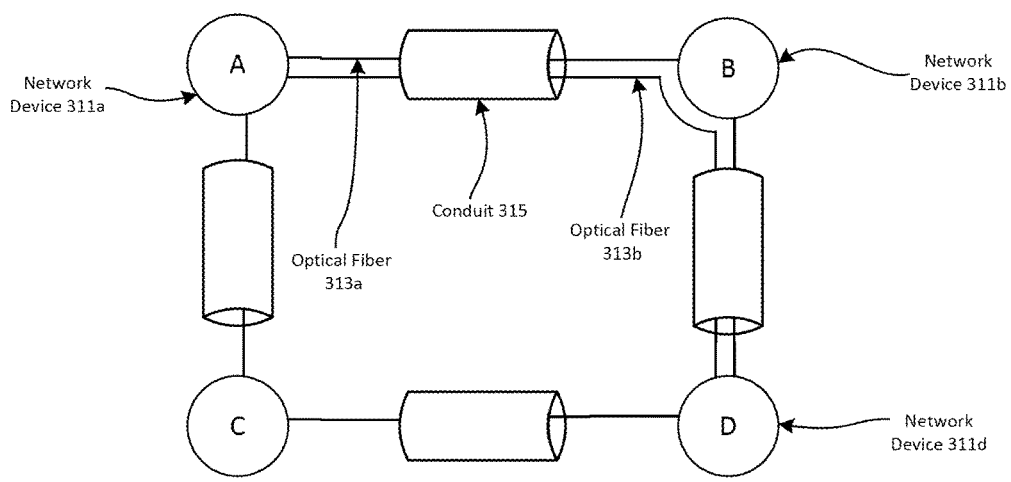
FIG. 3A depicts an exemplary communication network including communications links that are associated with shared risk groups (SRGs), consistent with disclosed embodiments.
Figure 3B:
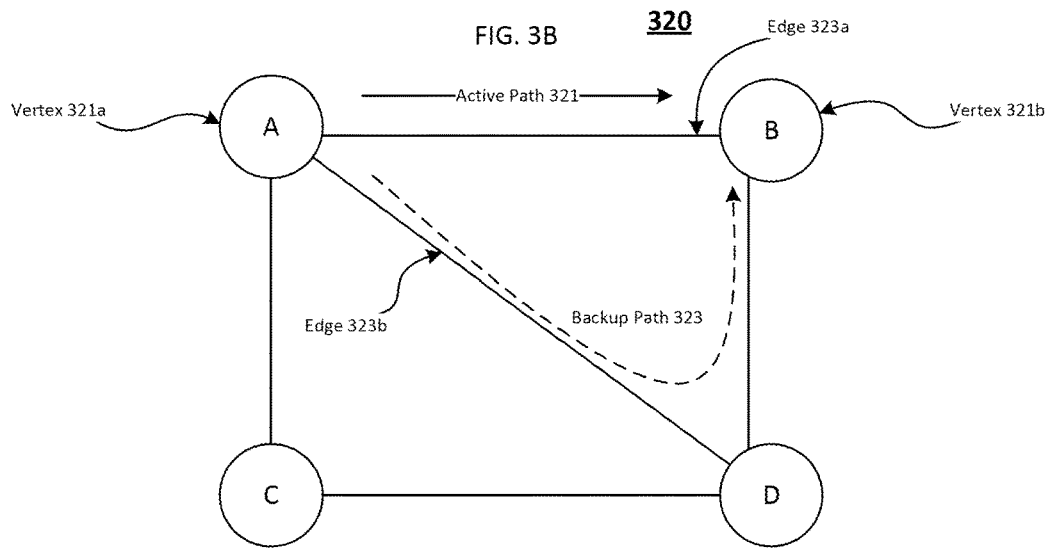
FIGS. 3B and 3C depict alternate routing of an active path and a backup path on a representation of the communication network of FIG. 3A, consistent with disclosed embodiments.
Figure 3C:
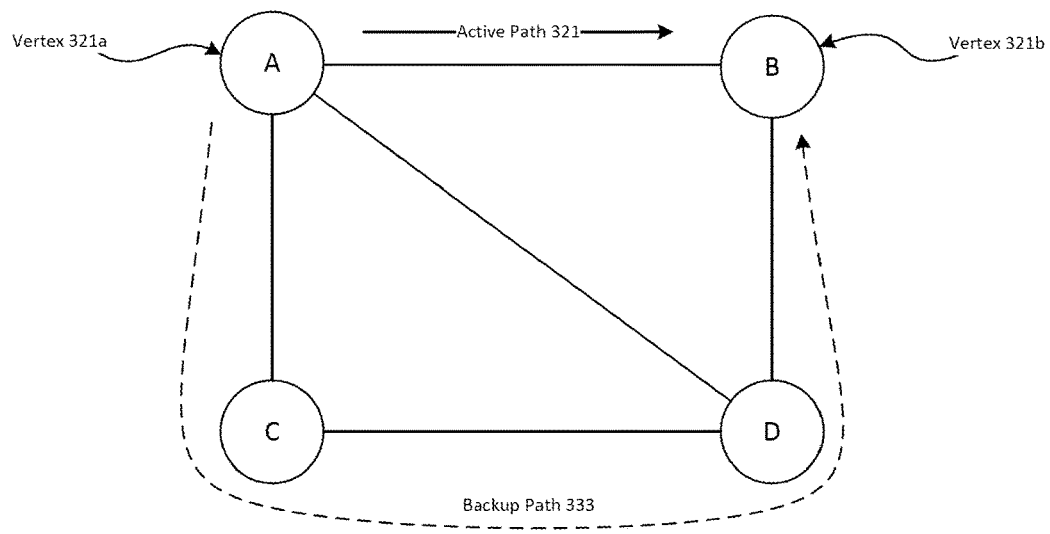

FIGS. 3A to 3C illustrate selection of SRLG-disjoint network paths for a demand. FIG. 3A depicts an exemplary optical communication network 100 including network devices (e.g., network devices 311*a*, 311*b*, and 311*d*) connected by optical fibers (e.g., optical fiber 313*a* and 313*b*), consistent with disclosed embodiments. In this example, the optical fibers connecting network devices are bundled into conduits (e.g., conduit 315). Not all optical fibers in a conduit connect the same network devices. For example, optical fiber 313*a* and 313*b* are both bundled into conduit 315, but optical fiber 313*a* connects network device 311*a* and network device 311*b*, while optical fiber 313*b* connects network device 311*a* and network device 311*d*. As may be appreciated, an event damaging or destroying one optical fiber in a conduit would likely damage or destroy all optical fibers in that conduit. Thus, optical fiber 313*a* and 313*b* can be manually, semi-automatically, or automatically associated with the same SRLG.

FIGS. 3B and 3C depict alternate routing of an active path and a backup path on a representation of the communication network of FIG. 3A, consistent with disclosed embodiments. The representation of the communication network can be a graph with vertices (e.g., vertex 321*a* corresponding to network device 311*a* and vertex 321*b* corresponding to network device 311*b*) and edges (e.g., edge 323*a* corresponding to optical fiber 313*a* and edge 323*b* corresponding to optical fiber 313*b*).

As shown in FIG. 3B, a demand with vertex 321*a* as the source vertex and vertex 321*b* as the terminal vertex can be satisfied active path 321 and backup path 323. However, the active path and the backup path share an SRLG, as the optical links corresponding to edge 323*a* and 323*b* are bundled in conduit 315. So this routing may not provide a desired degree of reliability, as damage to conduit 315 could disrupt both the active and backup paths.

As shown in FIG. 3C, a demand with vertex 321*a* as the source vertex and vertex 321*b* as the terminal vertex can also be satisfied with active path 321 and backup path 333. Unlike backup path 321, backup path 333 is SRLG-disjoint with active path 321. Thus this routing is more reliable, as damage to conduit 315 is unlikely to affect the optical fibers implementing backup path 333.

Figure 4:
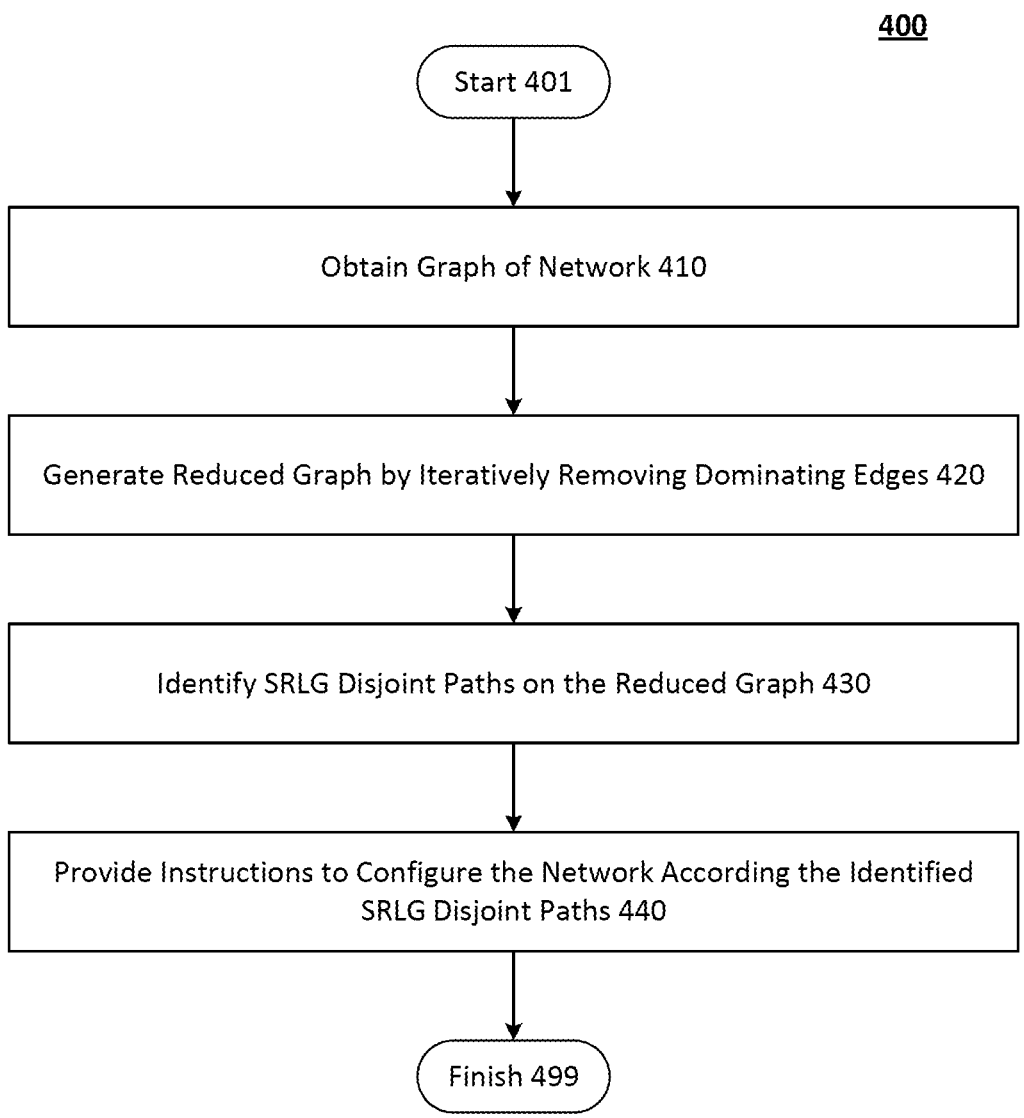
FIG. 4 depicts a process for configuring a network, consistent with disclosed embodiments.

FIG. 4 depicts a process 400 for configuring a network (e.g., service network 160, or the like) to implement SRLG-disjoint paths (e.g., an active path and backup path as depicted in FIG. 3C), consistent with disclosed embodiments. Process 400 can be performed by a computing system (e.g., network management system 150, or the like). The computing system can interact with the network and/or a database (e.g., database 170, or the like) to perform process 400. Consistent with disclosed embodiments, the computing system can provide instructions to nodes 120 to configure those nodes to implement the network path(s) determined by process 400.

In step 401, process 400 can start. In some embodiments, process 400 can occur according to a schedule. In various embodiments, process 400 can occur in response to an event. For example, the network management system can be provided with a set of demands. As an additional example, the network management system can be notified of a change in the state of the network (e.g., the addition, removal, failure, or restoration of one or more nodes or links, or the like).

In step 410, the computing system can obtain a graph of the network. In some embodiments, the computing system can receive or retrieve the graph of the network from at least one of the database or node(s) of the network (e.g., one or more of nodes 120). In some embodiments, the computing system can generate or estimate the graph of the network. The network graph can be generated from link information, which can describe links between nodes in the network (or active links, or links with available capacity, or links meeting some other criteria). In some embodiments, link information can be provided by nodes in the network to the computing system, which can then generate the network graph. In various embodiments, link information can be provided by nodes in the network to the database, another node in the network, or to another system. The receiving node or other system may generate the network graph or may provide the link information to the computing system, which may generate the network graph. In some embodiments, link information can be provided by another system or by a user interacting with the computing system.

In some embodiments, the computing system can obtain a demand on the network. As described herein, the demand can indicate a source node and a target node. This indication can be express (e.g., specifying the source and target node) or implicit (e.g., a demand received by a particular node from a client device can be deemed to implicitly specify that particular node as the source node). The computing system can receive or retrieve demands from nodes, the database, or another system. In some embodiments, the nodes or other system can provide the demands directly to the computing system. In various embodiments, the nodes or other system can provide the demands indirectly to the computing system (e.g., by storing the demands in the database for retrieval by the computing device).

Process 400 is not limited to any particular implementation of the network graph, the links, or the demand. In some embodiments, the graph, links, or demands can be stored or communicated using a data-interchange format (e.g., JSON, or the like), markup language (e.g., XML or the like), database format (e.g., ORACLE, MYSQL, or the like) spreadsheet format, or other suitable formats.

In step 420, the computing system can generate a reduced graph by iteratively removing dominating edges of the graph, consistent with disclosed embodiments. The reduced graph can be generated from the original graph received in step 410. In each iteration, as described in greater detail with respect to FIG. 5, the computing system can select an edge in an existing graph. This existing graph can be the original graph as modified by the removal of previously identified dominating edges. The computing system can determine whether the selected edge is a dominating edge of the existing graph, with respect to the demand obtained in step 410.

The computing system can continue to remove dominating edges from the existing graph until a criterion is satisfied. In some embodiments, the criterion can depend on the number of edges removed from the original graph, the number of edges remaining in the existing graph, the elapsed time spent removing edges, or the number of edges checked since identification of the last dominating edge. In some embodiments, the criterion can be satisfied when the computing system determines that no edges in the existing graph are dominating edges. The reduced graph can be, or be based upon, the existing graph when the criterion is satisfied.

In step 430, two or more SRLG-disjoint paths can be identified on the reduced graph generated in step 420, consistent with disclosed embodiments. The disclosed embodiments are not limited to using any particular method of identifying SRLG-disjoint paths on the reduced graph. In some embodiments, the computing system can use integer linear programming and an ILP solver (e.g., Cplex, CBC, Garubi) to determine the two or more SRLG-disjoint paths. The integer linear programming objective function, decision variables, and constraints can be formulated according to known methods. In various embodiments, the computing system apply a heuristic approach. In such a heuristic approach, the computing device can determine the set of paths on the reduce graph between the source node and the target node of the demand. The computing device can then select one of the paths and identify the SRLGs associated with the edges comprising the selected path. The computing device can then identify edges associated with the identified SRLGs. The computing device can form a new graph from the reduced graph by removing from the reduced graph any edges 1) associated with the identified SRLGs, and 2) not on the selected path. The computing device can then determine whether a path exists on the new graph between the source and target node. Such a path would necessarily be SRLG-disjoint with the selected path. The computing device can determine the paths in the set of paths and the path on the new graph using any suitable path-finding algorithm (e.g., Dijkstra, Breadth-First Searching, or another suitable algorithm).

In step 440, the computing system can provide instructions to configure the network to satisfy the demand obtained in step 410. In some embodiments, the computing system can provide the instructions directly to each node of the network that requires configuration. In various embodiments, the computing system can provide the instructions indirectly to such nodes. The computing system can provide the instructions to one node, which may then relay the instructions to other nodes. The computing system can provide the instructions to another system that then provides instructions (e.g., based on the instructions received from the computing system) directly or indirectly to each node of the network that requires configuration. In some embodiments, the instructions can specify the two or more SRLG-disjoint routes. In various embodiments, the instructions can specify wavelength assignments or other transmission details for the demand. In some embodiments, the instructions can be sufficient to configure hardware-based or software-based switches, routers, splitters, or the like to satisfy the demand. The disclosed embodiments are not limited to any particular implementation of these instructions.

In step 499, process 400 can terminate. In some embodiments, process 400 can be performed repeatedly, with a new demand in each iteration. In various embodiments, process 400 may provide an indication concerning whether two or more SRLG-disjoint routes were successfully identified. Such an indication can be provided to a user of the computing system, or to another computing system.

Figure 5:
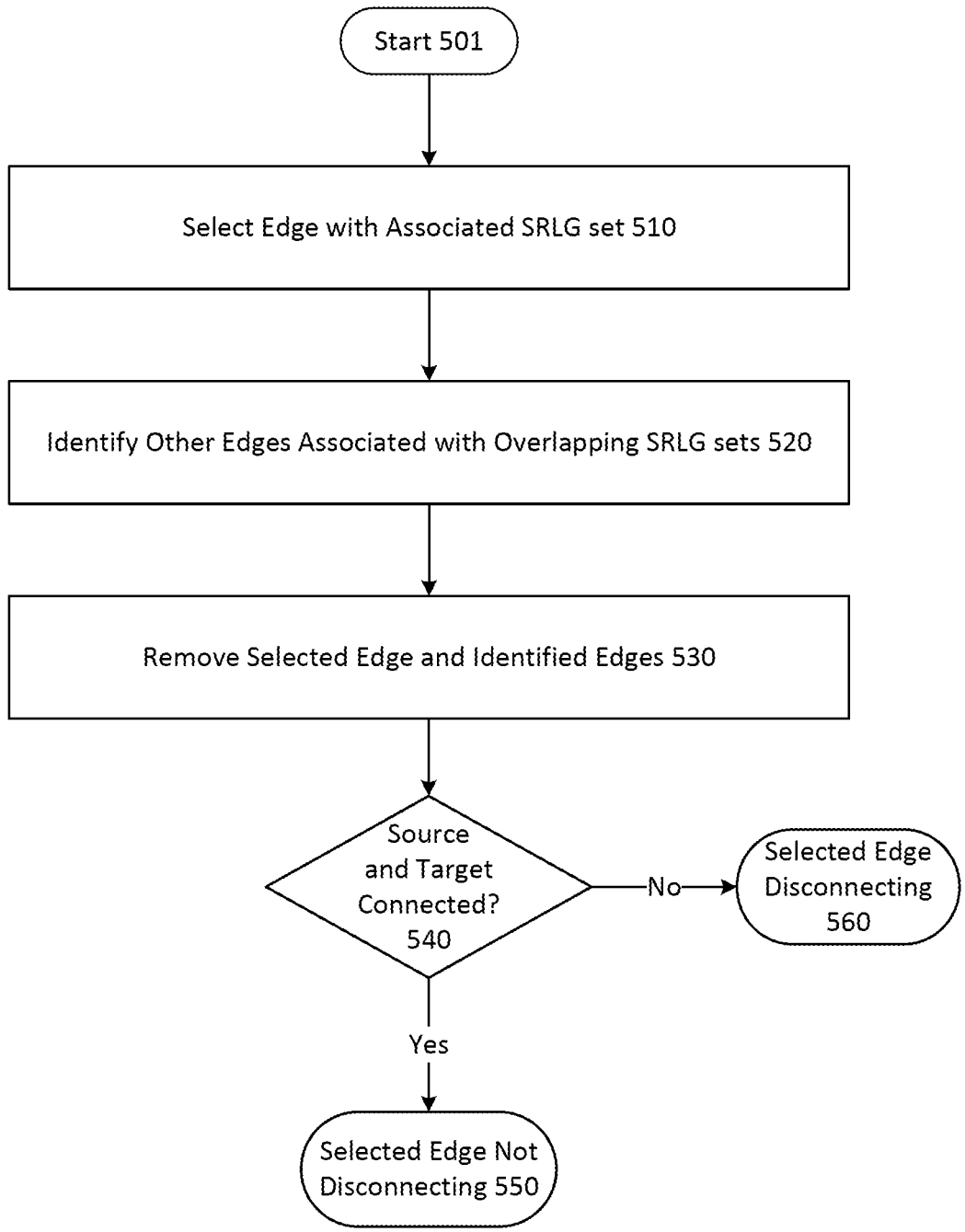
FIG. 5 depicts a process for iteratively removing dominating edges in a representation of a network, consistent with disclosed embodiments.

FIG. 5 depicts a process 500 for determining whether a selected edge in an existing graph is a dominating edge, consistent with disclosed embodiments. Process 500 can be performed as part of process 400 (e.g., as part of step 420), or as part of another suitable process for determining SRLG-disjoint paths on a representation of a network. Process 500 can be performed by a computing system (e.g., network management system 150, or the like). The computing system can interact with the network and/or a database (e.g., database 170, or the like) to perform process 500. Process 500 can include selecting an edge in the existing graph and determining whether selection of that edge precludes identification of an SRLG-disjoint path between the source and target nodes of a demand.

In step 501, the computing system can begin process 500. The computing system may obtain or have previously obtained an existing graph (or node and link information specifying the existing graph). The existing graph can be an original graph representing a network, or a graph generated by removing one or more edges from an original graph. For example, a prior iteration of process 500 (or another suitable process) may have identified and removed a dominating edge from an original graph (or a previous iteration of the existing graph) to generate the existing graph. The disclosed embodiments are not limited to any particular method of storing the existing graph. In various embodiments, the existing graph can be stored as a data structure, file, record, database, or the like. The computing system can also obtain a flow on the original graph. The flow can correspond to a demand on the network represented by the graph (e.g., the demand obtained in step 410). The flow can specify a source and a target vertex in the graph. The source vertex can correspond to the source node in the network, while the target vertex can correspond to the target node in the network. In some embodiments, the computing device can determine the flow based on or using the demand.

In step 510, the computing system can select an edge in the existing graph, consistent with disclosed embodiments. The edge can be associated with a set of SRLGs (e.g., through a mapping from edges to SRLGs). The disclosed embodiments are not limited to any particular method of maintaining this association. In various embodiments, the association(s) between the edge and the SRLG set (or individual SRLGs in the SRLG set) can be maintained using a data structure, file, record, database, or other suitable method. The disclosed embodiments are not limited to any particular method of selecting an edge in the existing graph. In some embodiments, the computing system can randomly select the edge. In various embodiments, such selection can be performed without replacement. Accordingly, the computing system may not re-select a previously selected, non-dominating edge until the existing graph has been updated (e.g., by identifying and removing another dominating edge). In some embodiments, the computing system can select the edge deterministically. For example, the computing system can deterministically traverse the file, data structure, database, or the like that stores the edges of the existing graph (or the original graph).

In step 520, the computing system can identify other edges dominated by the selected edge. In some embodiments, another edge can be dominated by the selected edge when a first SRLG set associated with the selected edge overlaps with a second SRLG set associated with the other edge (i.e. the edges are associated with overlapping SRLG sets), consistent with disclosed embodiments. SRLG sets can overlap when the intersection of the SRLG sets is not the empty set. The disclosed embodiments are not limited to any particular method of identifying edges in the existing graph associated with SRLG sets that overlap with the SRLG set associated with the selected graph. Furthermore, as used herein, identification of edges associated with overlapping SRLG sets can be performed by identifying all the edges with non-overlapping SRLGs (e.g., the complement of the set of edges with overlapping SRLG). For example, when the existing graph is stored as records in a database, each record corresponding to an edge, with one or more fields in each record containing SRLG information for an edge, the computing device could obtain the records for edges with overlapping (or non-overlapping) SRLGs using a database query.

In step 530, the computing system can remove the selected edge and the edges identified in step 520 from the existing graph, consistent with disclosed embodiments. The disclosed embodiments are not limited to any particular method of implementing such removal. In some embodiments, such removal can include creating a copy of the data structure, file, record, database, or the like that stores a version of the existing graph that lacks the removed edges. In various embodiments, an indication can be associated with the "removed" edges that specifies that the "removed" edges are not to be used in determining paths. Such an indication can be included in the data structure, file, record, database, or the like that stores the existing graph, or in another separate data structure, file, record, or the like that tracks which edges have been removed edges.

In step 540, the computing system can determine whether removal of the selected edge and identified edges disconnects the source vertex from the target vertex. The disclosed embodiments are not limited to a particular method for performing this determination. In some embodiments, Dijkstra's algorithm, a breadth first search, a depth-first search, or the like can be used to determine whether removal of the selected edge and identified edges disconnects the source vertex from the target vertex. Consistent with disclosed embodiments, the determination can be performed on a copy of the existing graph that lacks the removed edges, or the determination can respect an indication that "removed" edges are not to be used in determining paths. Should the removal of the selected edge and identified edges disconnect the source vertex from the target vertex, process 500 can proceed to step 560. Otherwise, process 500 can proceed to step 550.

In step 550, process 500 can terminate. Consistent with disclosed embodiments, the removal of the selected and identified edges from the existing graph can be reversed. The disclosed embodiments are not limited to any particular method for implementing this reversal. For example, when the determination of step 540 was performed on a copy of the existing graph that lacked the removed edges, not further action may be necessary. Instead, the next iteration of process 500 may use the existing graph. As an additional example, when the determination of step 540 respected an indication that "removed" edges are not to be used in determining paths, that indication can be removed, deleted, or overwritten.

In step 560, process 500 can terminate. Consistent with disclosed embodiments, the existing graph can be updated to reflect the removal of the selected edge. The disclosed embodiments are not limited to any particular method for implementing this updating. For example, when the determination of step 540 was performed on a copy of the existing graph that lacked the removed edges, the existing graph can be updated to delete the selected edge, while retaining the edges identified in step 520. As an additional example, when the determination of step 540 respected an indication that "removed" edges are not to be used in determining paths, that indication can be removed, deleted, or overwritten for the edges identified in step 520, while being retained for the selected edge.

FIGS. 6A to 6G depict determination of SRLG-disjoint paths on a graph 600 that represents a network, consistent with disclosed embodiments. Graph 600 includes a source vertex 601 and a target vertex 603, specified by a demand on the network. Graph 600 further includes an odd vertex 605 and an even vertex 607; intermediate vertices 621 to 623, and subnetworks 611 to 616. Subnetworks 611 to 616 represent multiple nodes and edges of arbitrary complexity. Each edge depicted in graph 600 is associated with a subset of the SRLG set S={1, 2, 3, 4, 5, 6, 7}. For example, the edge connecting source vertex 601 and even vertex 607 is associated with the SRLG set {2, 4, 6}, while the edge connecting source vertex 601 and odd vertex 605 is associated with the SRLG set {1, 3, 5, 7}. For the purposes of this example, the edges comprising each of subnetworks 611 to 616 are assumed to be SRLG disjoint with 1) the edges comprising the other subnetworks and 2) the other edges in graph 600. As described previously herein, graph 600 and the removal of edges from graph 600 can be implemented in any suitable fashion without departing from the scope of the envisioned embodiments. Accordingly, for ease of explanation, the implementation details of graph 600 and of the removal of edges from graph 600 will not be addressed in this example.

Figure 6A:
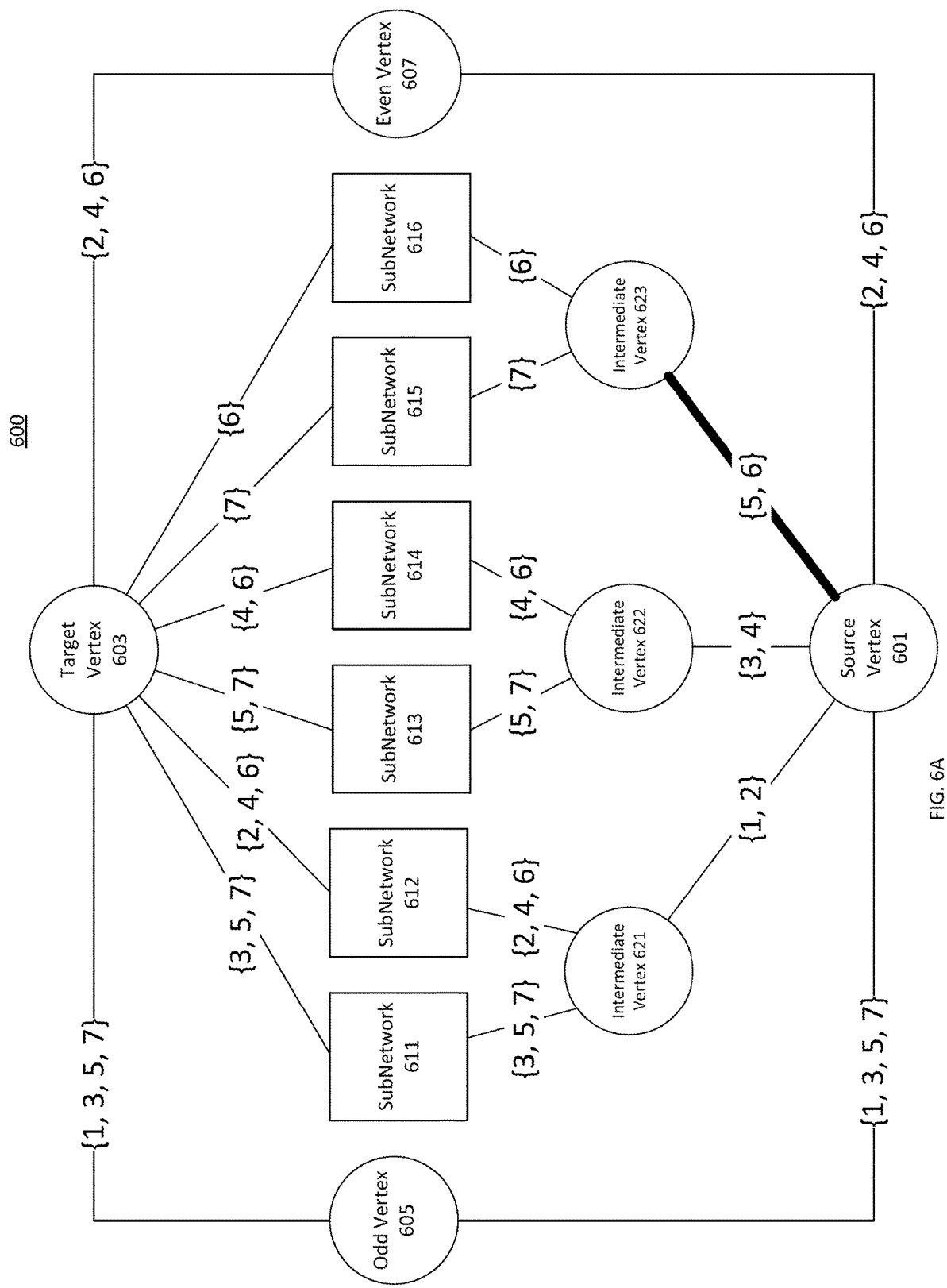
FIGS. 6A to 6G depict the application of the process of FIG. 5 to an exemplary representation of a network, consistent with disclosed embodiments.
Figure 6B:
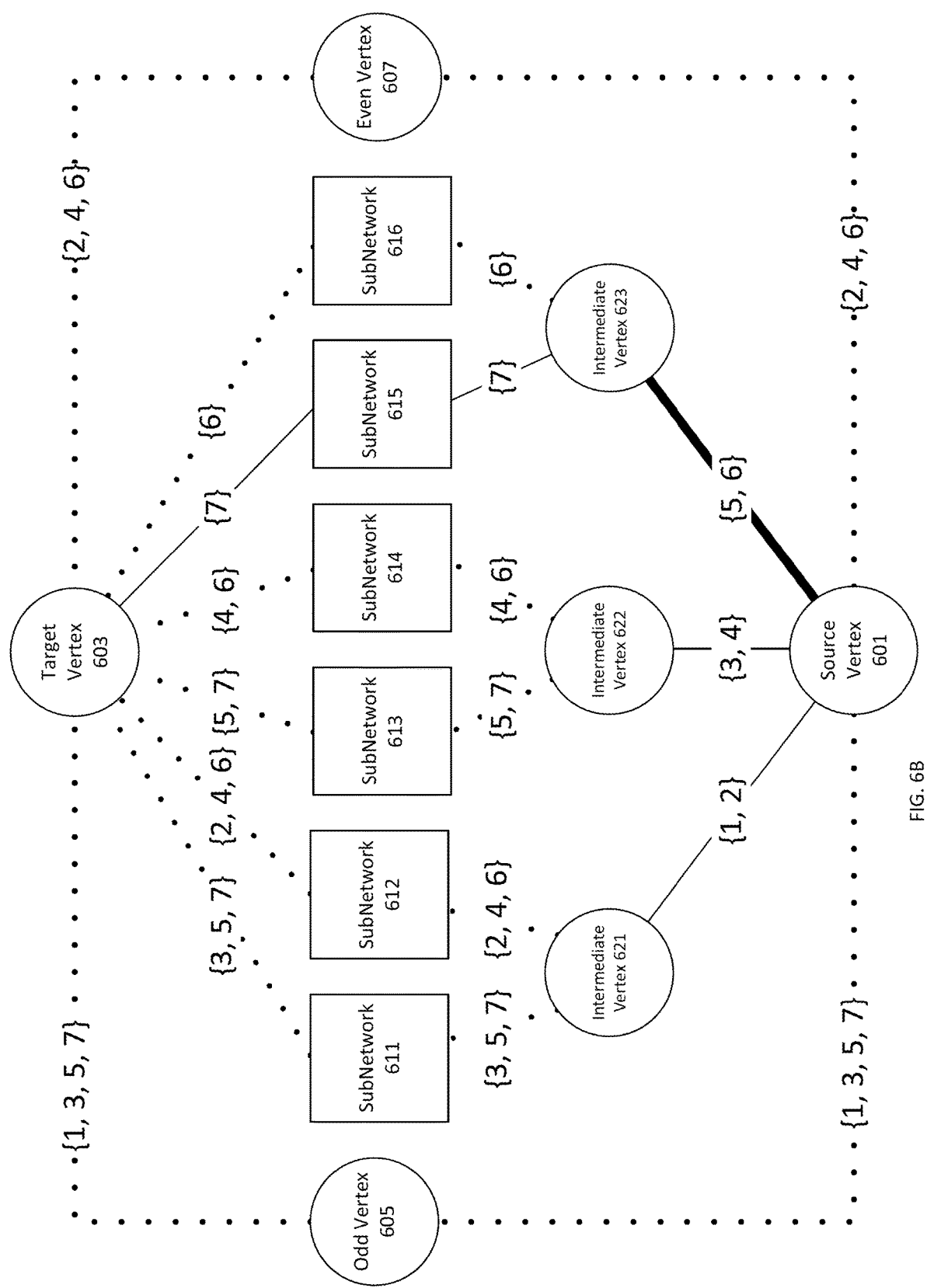
Figure 6C:
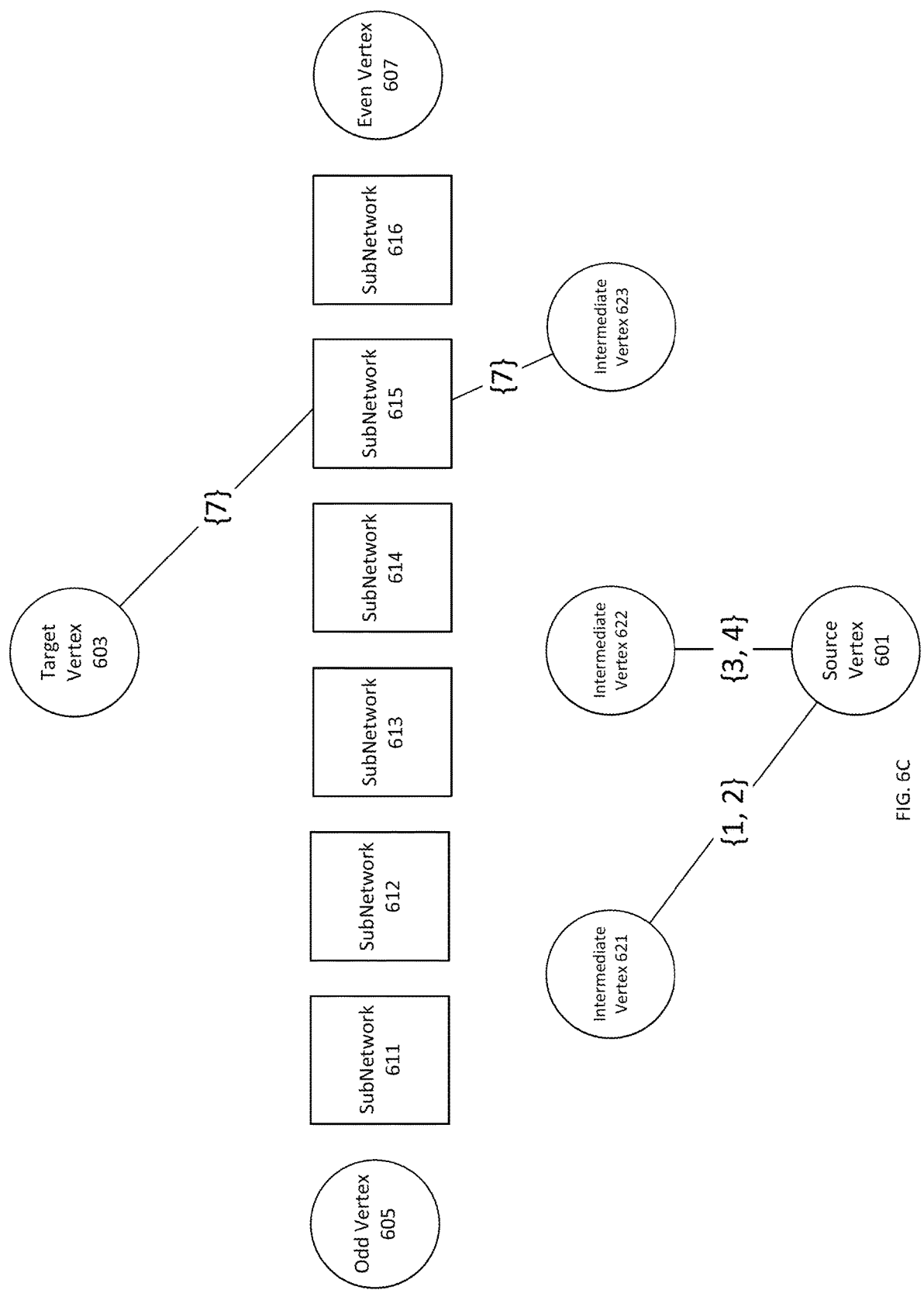

In FIG. 6A, the edge between source vertex 601 and intermediate vertex 623 of graph 600 has been selected (e.g., at step 510 of process 500). This edge is shown in bold. The SRLG set associated with this edge is {5, 6}. In FIG. 6B, the edges associated with SRLG groups that overlap with {5, 6} have been identified (e.g., at step 520 of process 500). These edges are shown as dotted lines. In FIG. 6C, the selected edge and identified edges have been removed (e.g., at step 530 of process 500). The computing system can determine that removal of these edges disconnects the source vertex 601 from target vertex 603. Accordingly, the edge between source vertex 601 and intermediate vertex 623 is a dominating edge. Graph 600 can be updated to remove this edge, generating graph 610.

Figure 6D:
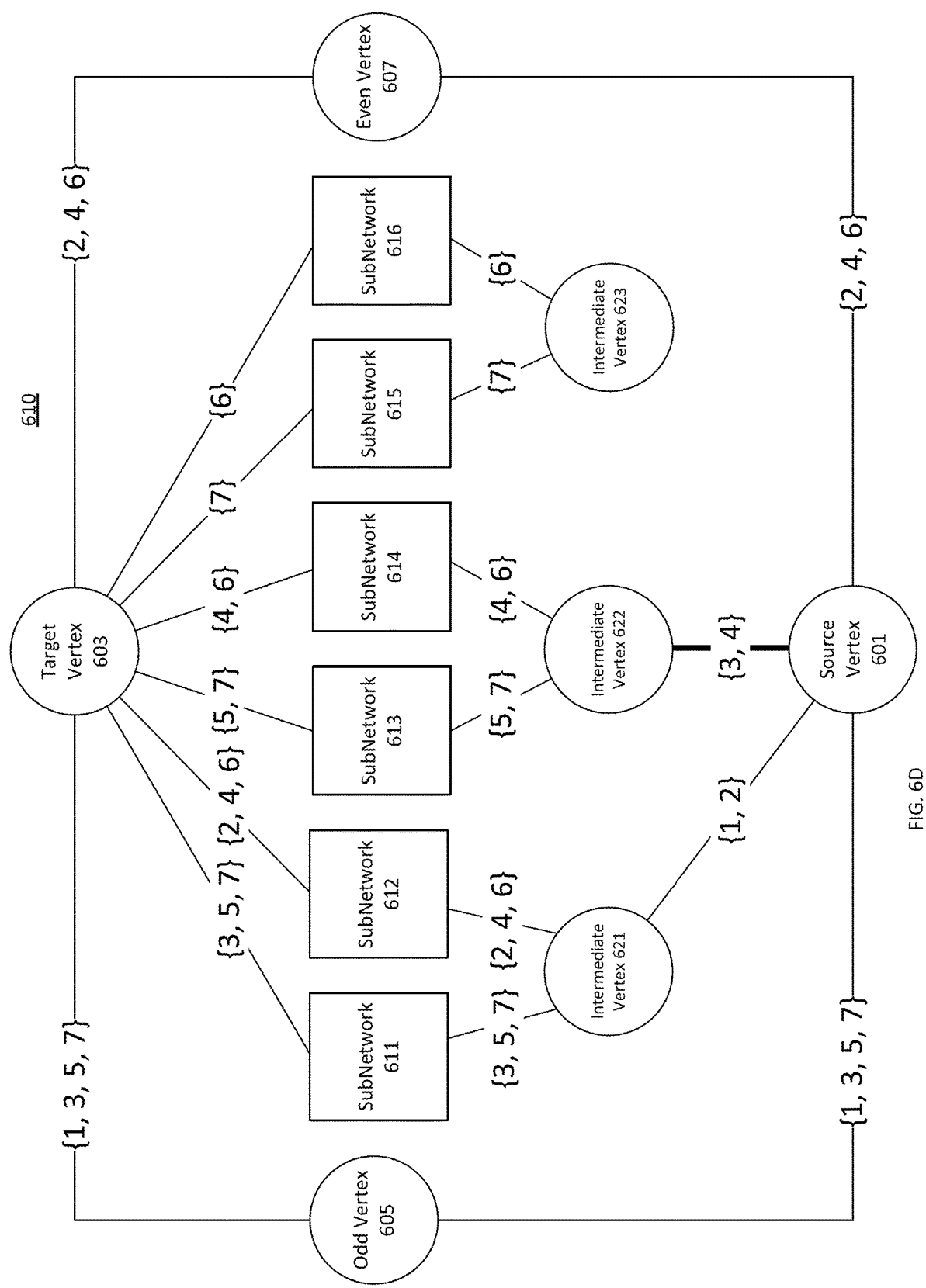
Figure 6E:
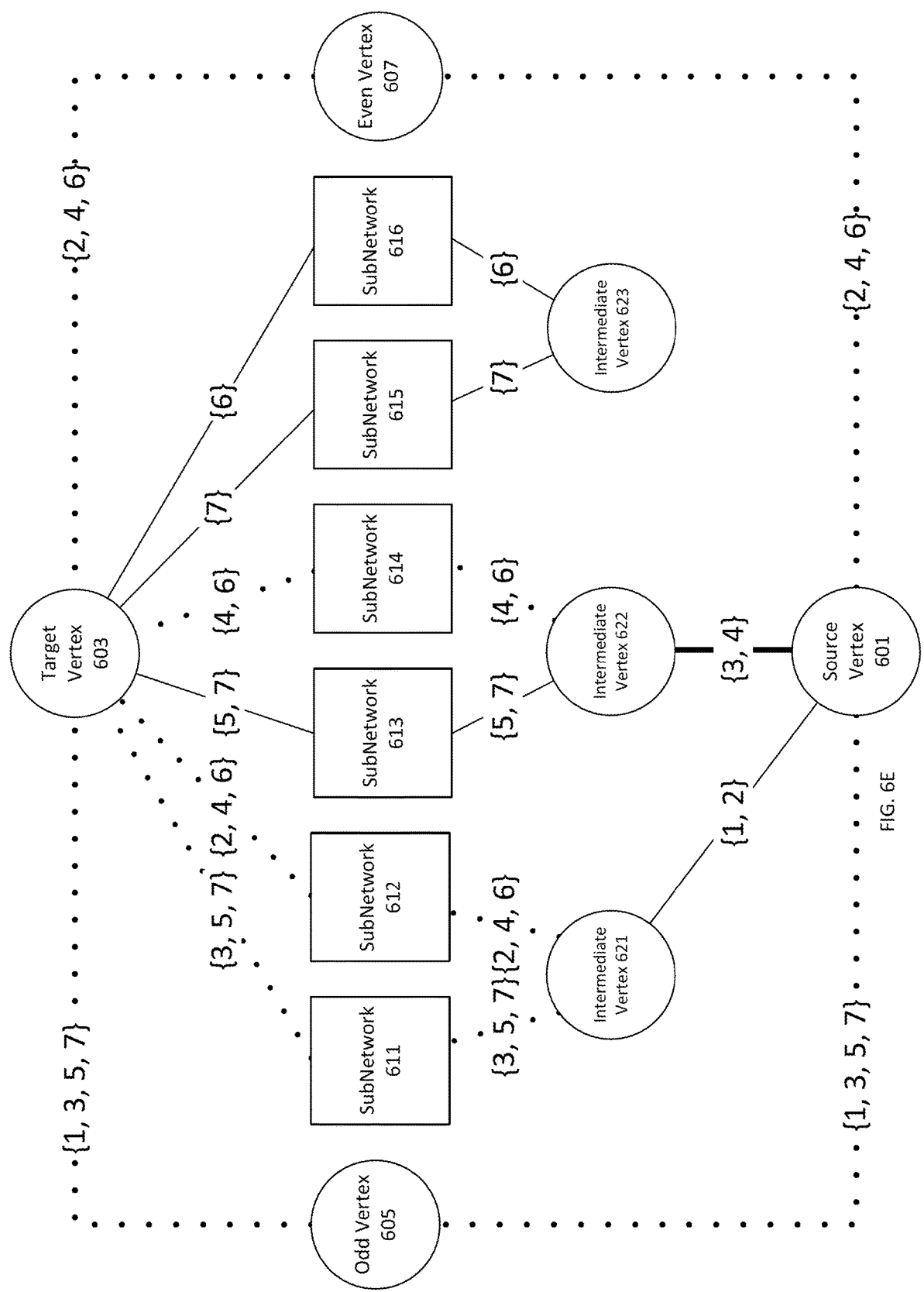
Figure 6F:
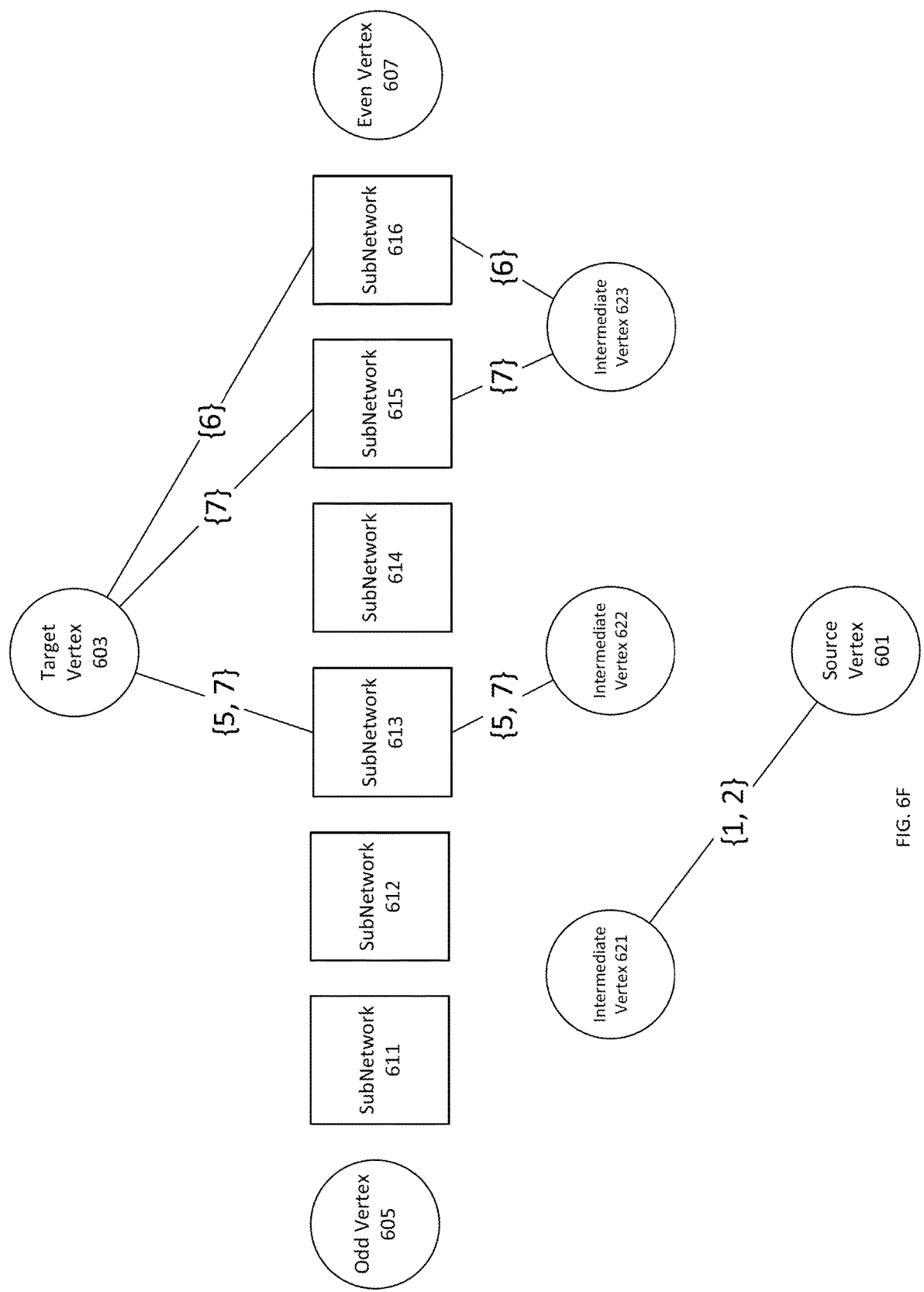

In FIG. 6D, the edge between source vertex 601 and intermediate vertex 622 of graph 610 has been selected (e.g., at step 510 of process 500). This edge is shown in bold. The SRLG set associated with this edge is {3, 4}. In FIG. 6E, the edges associated with SRLG groups that overlap with {3, 4} have been identified (e.g., at step 520 of process 500). These edges are shown as dotted lines. In FIG. 6F, the selected edge and identified edges have been removed (e.g., at step 530 of process 500). The computing system can determine that removal of these edges disconnects the source vertex 601 from target vertex 603. Accordingly, the edge between source vertex 601 and intermediate vertex 622 is a dominating edge. Graph 610 can be updated to remove this edge, generating a new graph.

Identification of the dominating edges in graph 600 can include additional iterations of process 500. In this example, the computing system can continue selecting and testing edges until an edge is identified as a dominating edge or all remaining edges have been identified as non-dominated edges. When an edge is identified as a non-dominating edge, that edge can be retained, and another edge selected. For example, the edge between target vertex 603 and subnetwork 616 can be selected and determined to be a non-dominating edge. When an edge is identified as a dominating edge, that edge can be removed, and the selection and testing restarted. Whether an edge is identified as a dominating edge can depend on which edges have previously been removed from the graph. For example, prior to the removal of the edge between source vertex 601 and intermediate vertex 623, the edge between source vertex 601 and intermediate vertex 622 is not a dominating edge. As an additional example, following removal of the edges connecting source vertex 601 and each of intermediate vertices 622 and 623, the edge connecting source vertex 601 and intermediate vertex 621 can be selected, determined to be a dominating edge, and removed.

Figure 6G:
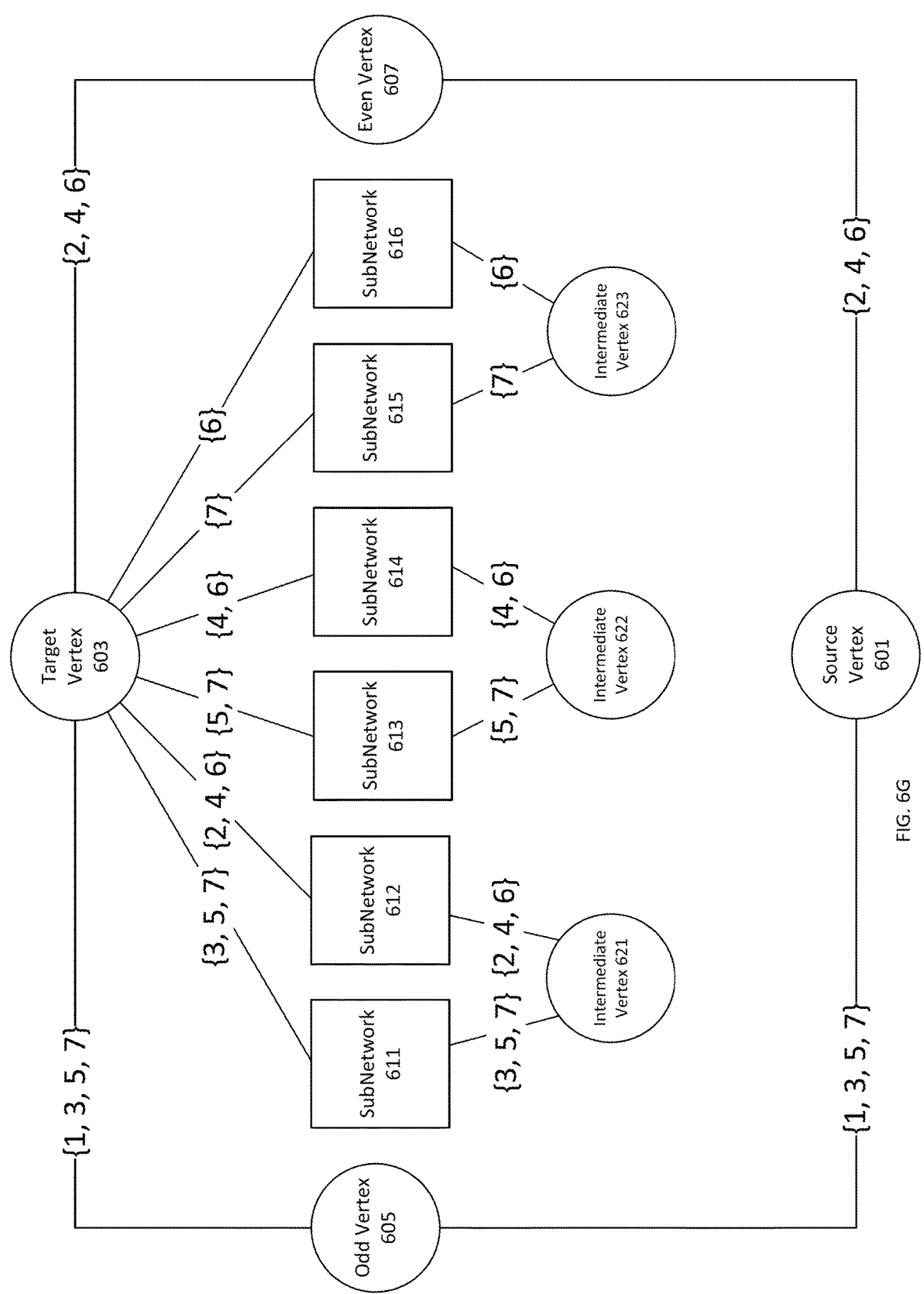

FIG. 6G depicts the status of the reduced graph generated from the original graph (e.g., by step 420 of process 400). A suitable path-finding algorithm (e.g., ILP, heuristic, or the like) can be used to find two SRLG-disjoint paths on this reduced graph (e.g., in step 430 of process 400). In this example, one such path proceeds from source vertex 601, through odd vertex 605, to target vertex 603. Another SRLG-disjoint path proceeds from source vertex 601, through even vertex 607, to target vertex 603.

As may be appreciated from the foregoing, graph 600 represents a family of network topologies. Network topologies in this family can include a source vertex, a target vertex and N intermediate vertices connected by N intermediate edges to the source vertex. For a $k^{th}$ intermediate vertex, for k between 1 and N, an edge connecting the $k^{th}$ intermediate vertex with the source vertex can be associated with shared risk link groups 2k−1 and 2k. An edge connecting the $k^{th}$ intermediate vertex with a $2k-1^{th}$ subnetwork can be associated with shared risk link groups 2m+1, for m from k to N. A link connecting the $2k-1^{th}$ subnetwork with the target vertex can be associated with the same shared risk link groups as the edge connecting the kth intermediate vertex with the $2k-1^{th}$ subnetwork. A kth intermediate edge connecting the $k^{th}$ intermediate vertex with a $2k^{th}$ subnetwork can be associated with shared risk link groups 2m, for m from k to N. An edge connecting the $2k^{th}$ subnetwork with the target vertex can be associated with the same shared risk link groups as the edge connecting the $k^{th}$ intermediate vertex with the $2k^{th}$ subnetwork.

An even vertex can be connected by a first edge to the source vertex and can be connected by a second edge to the target vertex. The first edge can be associated with shared risk link groups 2j, for j from 1 to N. The second edge can be associated with the same shared risk link groups as the first edge.

An odd vertex can be connected by a third edge to the source vertex and a fourth edge to the target vertex. The third edge can be associated with shared risk link groups 2j+1, for j from 0 to N. The fourth edge can be associated with the same shared risk link groups as the third edge.

A characteristic of networks with this structure is that application of process 400 results in the iterative identification and removal of the intermediate edges as dominating edges from the original graph to form the reduced graph. The first and second SRLG-disjoint paths can then be found as passing through the even and odd vertices from the source to the target vertex. Networks with this structure can be rapidly solved using process 400 for very large N (e.g., N greater than 20, or 100, or 200, or more), while conventional approaches may fail. For example, an approach consistent with process 400 applied to a graph with 264 vertices and 504 edges generated a reduced graph that an ILP solver could solve in less than one millisecond, while applying the ILP solver to the original graph caused the ILP solver to fail on a timeout exception.

Figure 7:
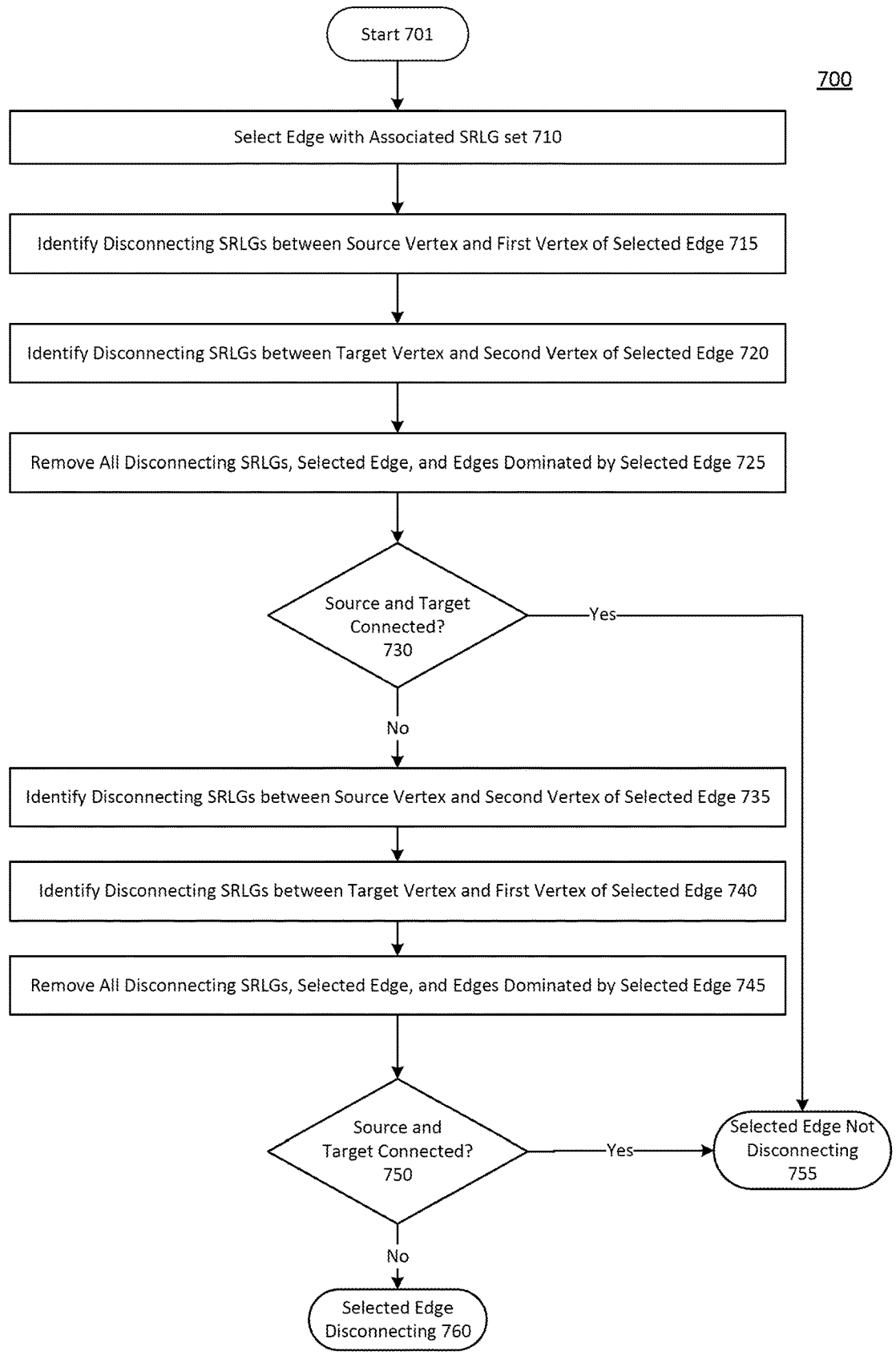
FIG. 7 depicts a process for iteratively removing dominating edges in a representation of a network, consistent with disclosed embodiments.

FIG. 7 depicts a method 700 of finding dominating edges according to an expanded definition of a dominating edge, consistent with disclosed embodiments. The expanded definition of a dominating edge considers both the SRLGs expressly associated with the edge and disconnecting SRLGs associated with the edge. A disconnecting SRLG can be an SRLG associated with any path between two vertices (e.g., between the source vertex and an endpoint of the dominating edge). When x is a first vertex of a graph with edges E, y is a second vertex of the graph, and s is an SRLG for the graph, then s is a disconnecting SRLG for x and y when removing all edges in the graph $e' \in E : s \subset M(e')$ disconnects x from y. Process 700 can be performed by a computing system (e.g., network management system 150, or the like). The computing system can interact with the network and/or a database (e.g., database 170, or the like) to perform process 700. Similar to process 400, process 700 can include selecting an edge in the existing graph and determining whether selection of that edge precludes identification of an SRLG-disjoint path between the source and target nodes of a demand. As described previously herein, the graph and the removal of edges from the graph can be implemented in any suitable fashion without departing from the scope of the envisioned embodiments. Accordingly, for ease of explanation, the implementation details of the graph and of the removal of edges from the graph will not be addressed in this example.

In step 701, the computing system can begin process 700. The computing system may obtain or have previously obtained an existing graph (or node and link information specifying the existing graph). The existing graph can be an original graph representing a network, or a graph generated by removing one or more edges from an original graph. For example, a prior iteration of process 700 (or another suitable process) may have identified and removed a dominating edge from an original graph (or a previous iteration of the existing graph) to generate the existing graph. The computing system can also obtain a flow on the original graph. The flow can correspond to a demand on the network represented by the graph (e.g., the demand obtained in step 410). The flow can specify a source and a target vertex in the graph. The source vertex can correspond to the source node in the network, while the target vertex can correspond to the target node in the network. In some embodiments, the computing device can determine the flow based on or using the demand.

In step 710, the computing system can select an edge in the existing graph, consistent with disclosed embodiments. The edge can be associated with a set of SRLGs (e.g., through a mapping from edges to SRLGs). As with step 510 of process 500, the disclosed embodiments are not limited to any particular method of selecting an edge in the existing graph.

In step 715, the computing system can identify all disconnecting SRLGs between the source vertex and a first vertex of the selected edge (e.g., a first set of disconnecting SRLGs). In some embodiments, the computing system can select an SRLG, identify all edges associated with that SRLG, remove the identified edges and the selected edge, and then determine whether removal of these edges disconnects the source vertex and the first vertex. When the removal of these edges disconnects the source vertex and the first vertex, the SRLG can be included in the first set of disconnecting SRLGs. The disclosed embodiments can use any suitable a path-finding algorithm to determine whether the source vertex and the first vertex are disconnected (e.g., Dijkstra, a breadth-first or depth-first pathfinding algorithm, or another suitable algorithm). The computing device can repeat this process, iterating over all the SRLGs in the graph (e.g., deterministically, through random selection without replacement, or another suitable method), or over all SRLGs in the graph that are not associated with the selected edge.

In step 720, the computing system can identify all disconnecting SRLGs between the target vertex and a second vertex of the selected edge (e.g., a second set of disconnecting SRLGs). In some embodiments, the computing system can identify an SRLG as a disconnecting SRLG as described above with regards to step 715 (but considering the target and second vertices, rather than the source and first vertices). SRLGs identified as disconnecting can be included in the second set of disconnecting SRLGs.

In step 725, the computing system can remove all edges in the graph associated with the first set of disconnecting SRLGs, the second set of disconnecting SRLGs, or the selected edge.

In step 730, the computing system can determine whether the removal of the edges in step 730 disconnects the source and target vertices. The disclosed embodiments can use any suitable a path-finding algorithm to determine whether the source vertex and the target vertex are disconnected (e.g., Dijkstra, a breadth-first or depth-first pathfinding algorithm, or another suitable algorithm). If the source and target vertices remain connected, then process 700 can proceed to step 755. If the source and target vertices are disconnected, then process 700 can proceed to step 735.

In step 735, the computing system can identify all disconnecting SRLGs between the source vertex and the second vertex of the selected edge (e.g., a third set of disconnecting SRLGs). In some embodiments, the computing system can identify an SRLG as a disconnecting SRLG as described above with regards to step 715 (but considering the source and second vertices, rather than the source and first vertices). SRLGs identified as disconnecting can be included in the third set of disconnecting SRLGs.

In step 740, the computing system can identify all disconnecting SRLGs between the target vertex and the first vertex of the selected edge (e.g., a fourth set of disconnecting SRLGs). In some embodiments, the computing system can identify an SRLG as a disconnecting SRLG as described above with regards to step 715 (but considering the target and first vertices, rather than the source and first vertices). SRLGs identified as disconnecting can be included in the fourth set of disconnecting SRLGs.

In step 745, the computing system can remove all edges in the graph associated with the third set of disconnecting SRLGs, the fourth set of disconnecting SRLGs, or the selected edge.

In step 750, the computing system can determine whether the removal of the edges in step 745 disconnects the source and target vertices. The disclosed embodiments can use any suitable a path-finding algorithm to determine whether the source vertex and the target vertex are disconnected (e.g., Dijkstra, a breadth-first or depth-first pathfinding algorithm, or another suitable algorithm). If the source and target vertices remain connected, then process 700 can proceed to step 755. If the source and target vertices are disconnected, then process 700 can proceed to step 735.

In step 755, process 700 can terminate. The next iteration of process 700 may use the existing graph. In step 760, process 700 can terminate. The existing graph can be updated to remove the selected edge as a dominating edge.

FIGS. 8A to 8D depict determination of SRLG-disjoint paths on a graph 800 that represents a network, consistent with disclosed embodiments. Graph 800 includes a source vertex 810 and a target vertex 820, specified by a demand on the network. Graph 800 further includes a first vertex 830, a second vertex 840, additional vertices 851 to 855 and 861 to 865. As depicted in FIGS. 8A to 8D, each edge depicted in graph 800 is associated with a subset of the SRLG set S={1, 2, 3}. For example, the edge connecting first vertex 830 and second vertex 840 (e.g., the selected edge) is associated with the SRLG set {2}, while the edge connecting vertex 851 and first vertex 830 is associated with the SRLG set {1}. As described previously herein, graph 800 and the removal of edges from graph 800 can be implemented in any suitable fashion without departing from the scope of the envisioned embodiments. Accordingly, for ease of explanation, the implementation details of graph 800 and of the removal of edges from graph 800 will not be addressed in this example.

Figure 8A:
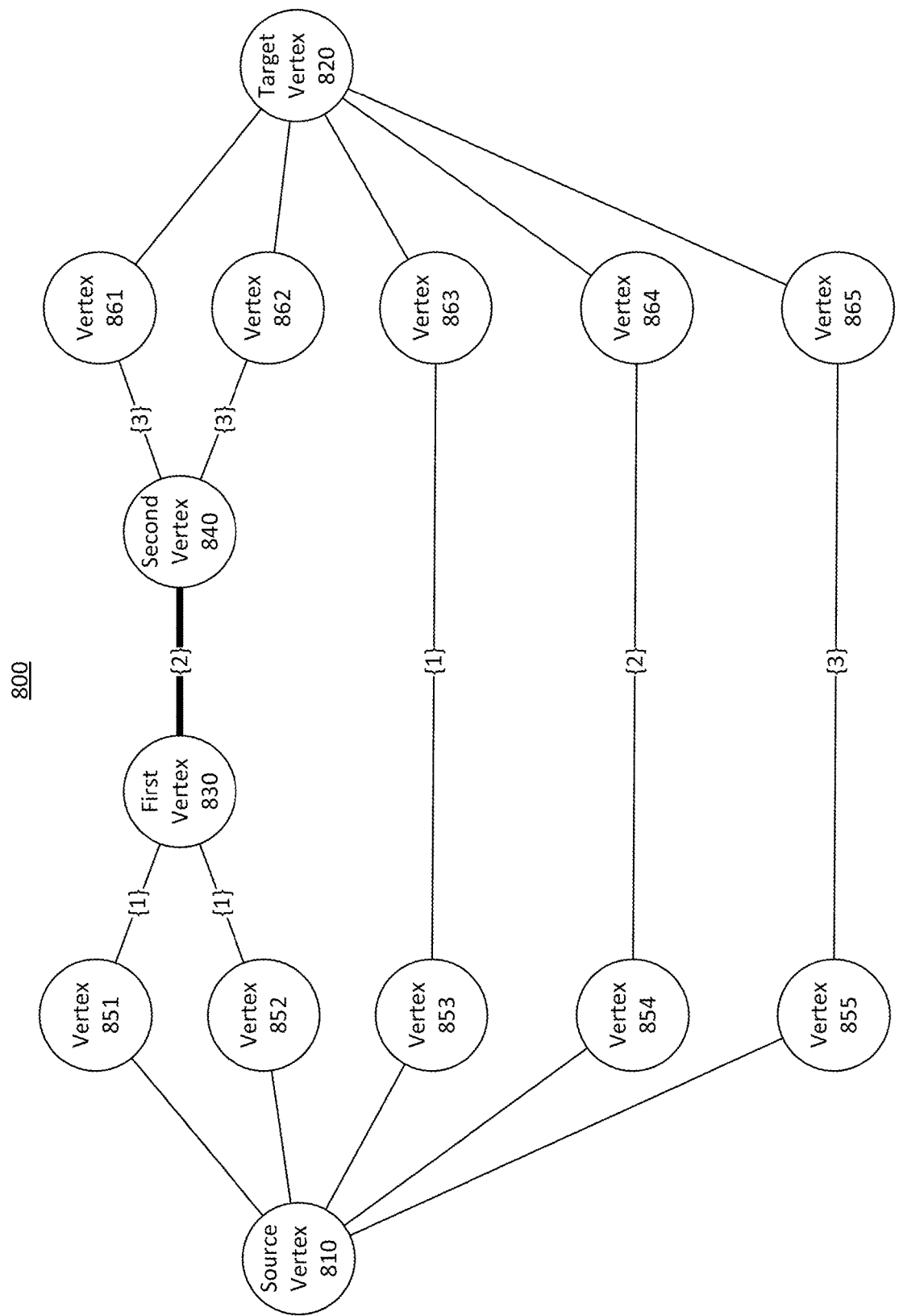
FIGS. 8A to 8D depict the application of the process of FIG. 7 to an exemplary representation of a network, consistent with disclosed embodiments.

FIG. 8A depicts graph 800 with the edge between first vertex 830 and first vertex 840 of graph 800 selected (e.g., at step 710 of process 700). This selected edge is shown in bold. The SRLG set associated with this edge is {2}.

Figure 8B:
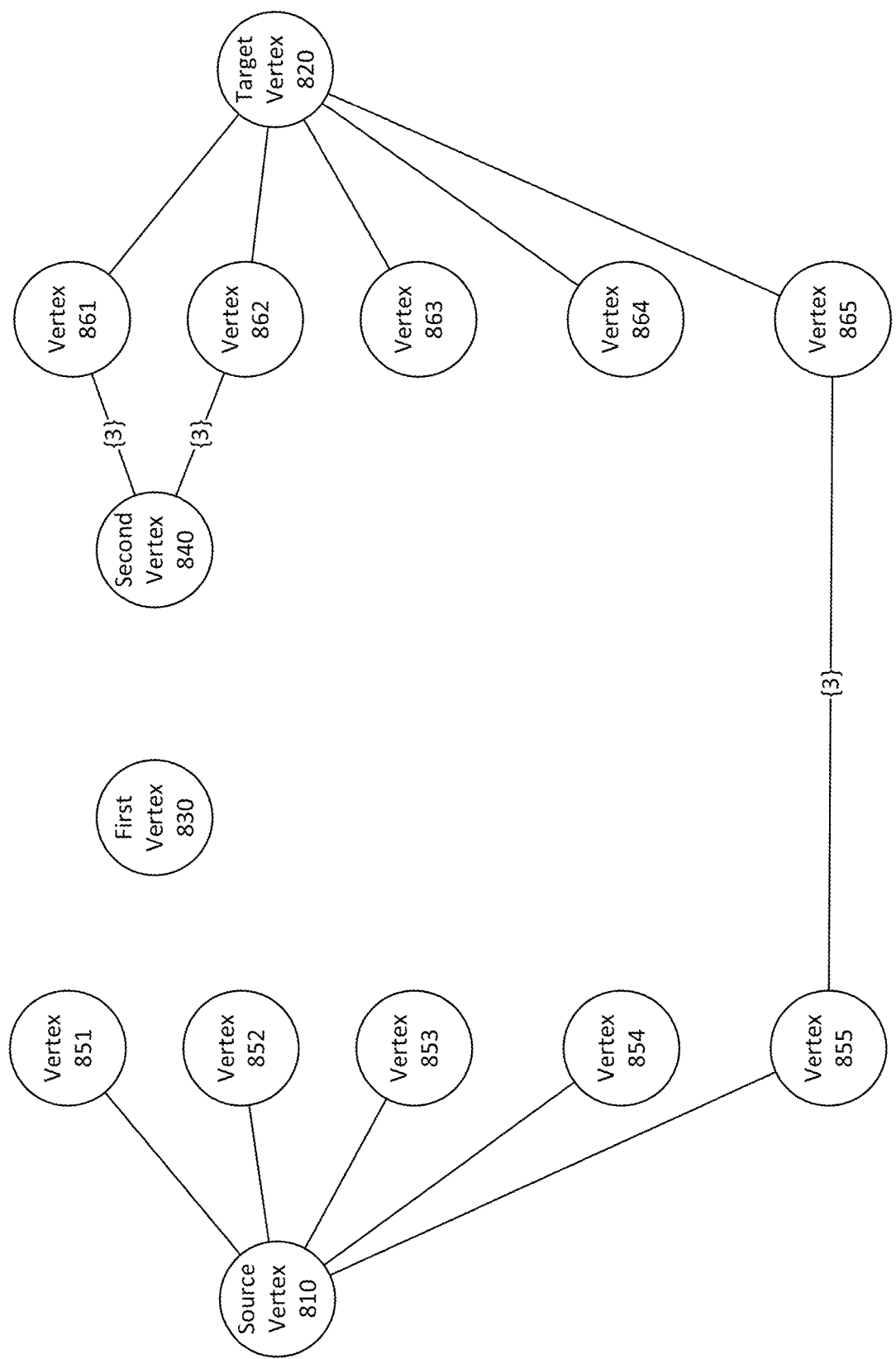

FIG. 8B depicts graph 800 with the selected edge and edges associated with SRLG 1 removed. The computing system can determine that removing these edges disconnects source vertex 810 from first vertex 830 (e.g., in step 715 of process 700). Thus the computing system can include SRLG 1 in the first set of disconnecting SRLGs.

Figure 8C:
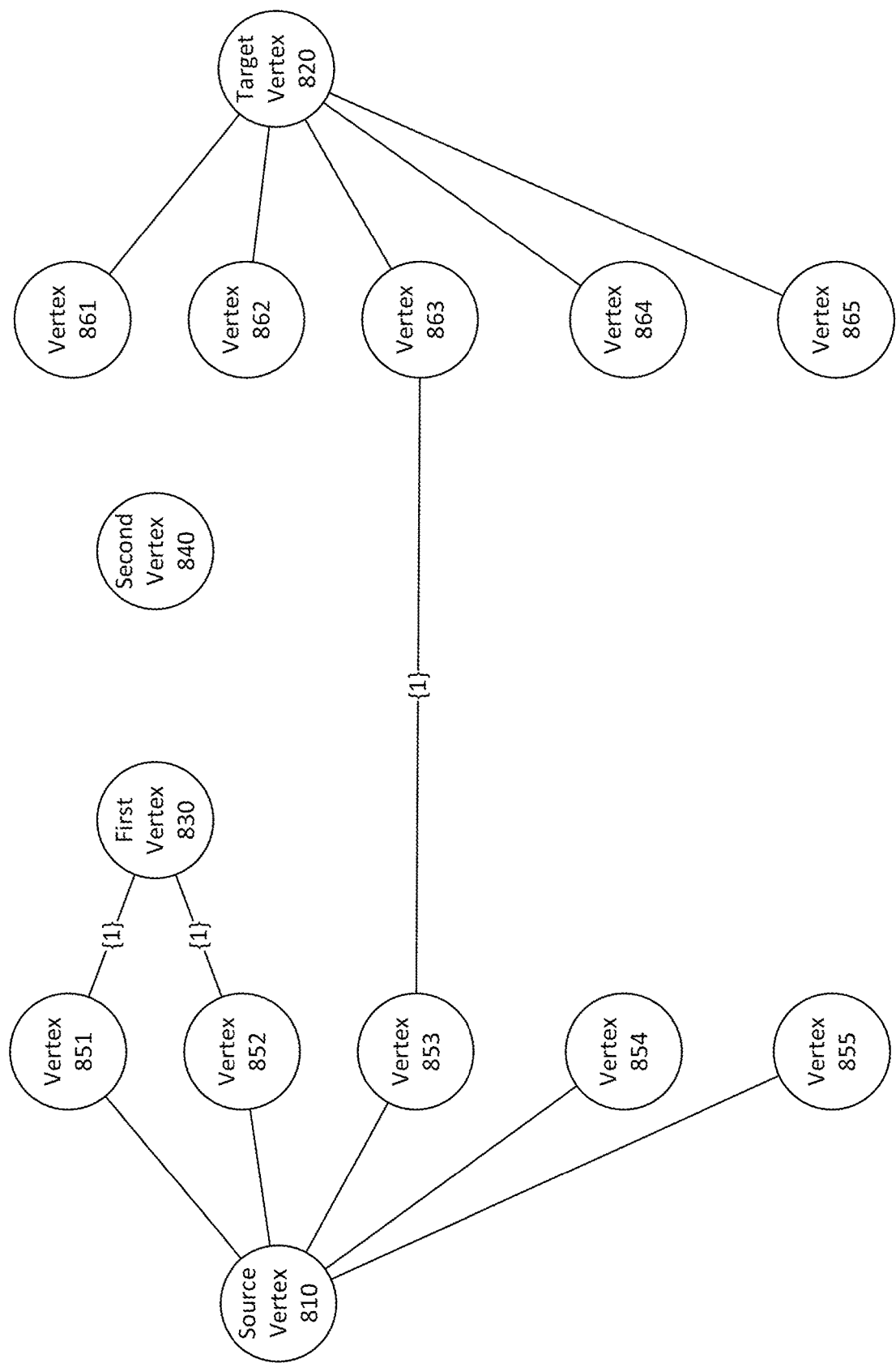

FIG. 8C depicts graph 800 with the selected edge and edges associated with SRLG 3 removed. The computing system can determine that removing these edges disconnects target vertex 820 from second vertex 840 (e.g., in step 720 of process 700). Thus the computing system can include SRLG 3 in the second set of disconnecting SRLGs.

Figure 8D:
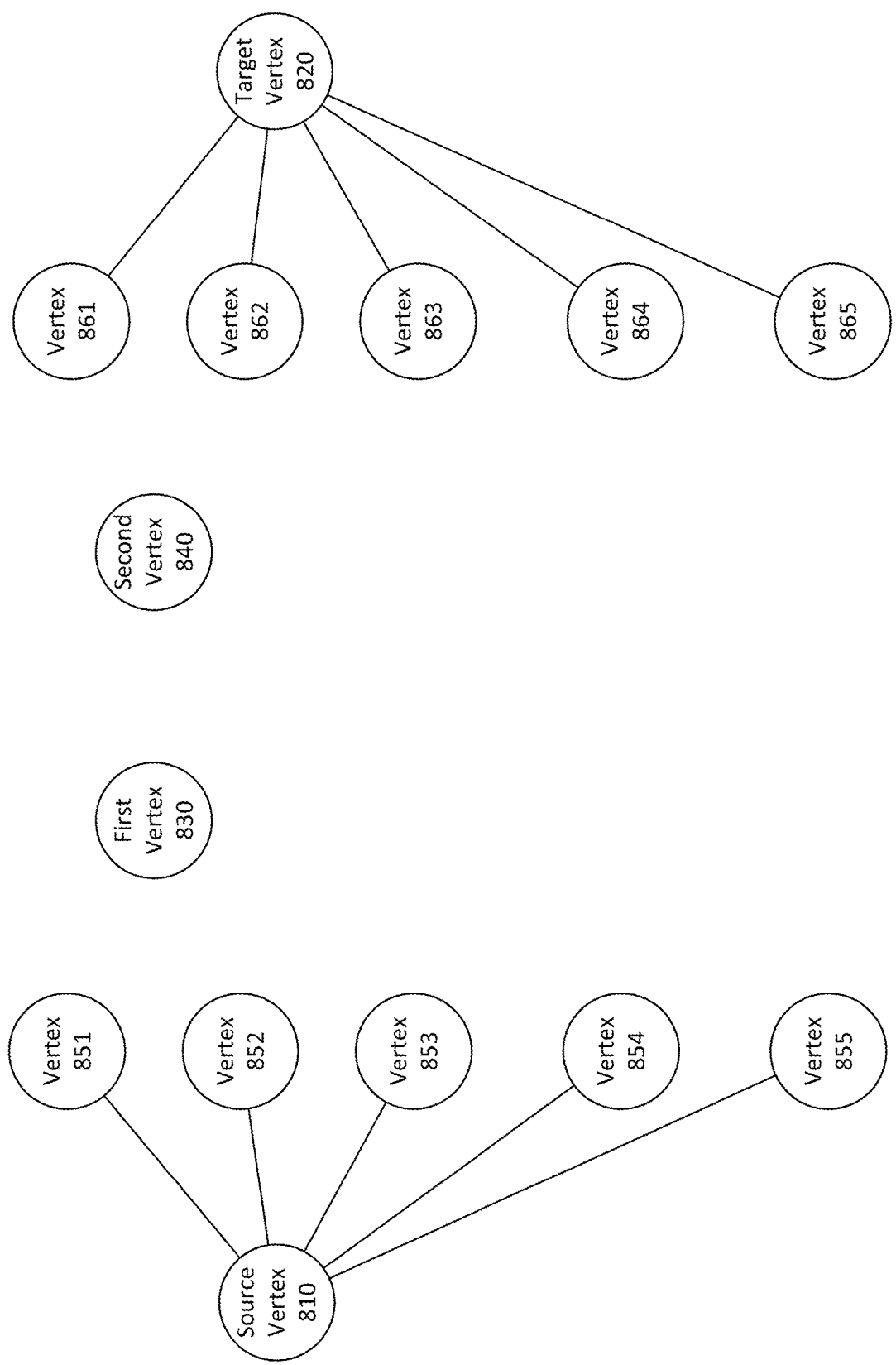

FIG. 8D depicts graph 800 with the selected edge and the edges associated with the first and second disconnecting SRLGs removed (e.g., in step 725 of process 700). The computing system can determine that removing these edges disconnects source vertex 810 from target vertex 820 (e.g., in step 730 of process 700). As the source and target vertices are disconnected, the computing system can determine third and fourth sets of disconnecting SRLGs, as described above with regards to FIG. 7. The computing system can determine that removing the edges associated with the selected edge and the third and fourth sets of disconnecting SRLGs also disconnects the source and target vertices. Consequently, the computing system can determine that the selected edge is a dominating edge and remove the selected edge from graph 800.

In exemplary embodiments, a non-transitory computer-readable storage medium including instructions is also provided, and the instructions may be executed by a device (such as a computer), for performing the above-described methods. For example, the non-transitory computer-readable storage medium may be a read-only memory (ROM), a Random-Access Memory (RAM), an electrically erasable programmable read-only memory (EEPROM), Programmable Array Logic (PAL), a disk, an optical disc, a Digital Versatile Disc (DVD), and so on.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A non-transitory, computer-readable medium containing instructions that, when executed by at least one processor of a system, cause the system to perform operations for determining shared risk link group (SRLG) disjoint paths, comprising:

obtaining an original graph representing a communications network, the original graph comprising:
    vertices corresponding to nodes in the communication network, the vertices including a source vertex and a target vertex, and
    edges corresponding to communication links in the communications network, each edge associated with a set of SRLGs (SRLG sets); and
generating a reduced graph from the original graph, the generation comprising:
    identifying a first edge of the edges as a dominating edge:
        wherein identifying the first edge as a dominating edge comprises determining that removing the first edge and edges dominated by the first edge disconnects the source vertex from the target vertex; or
        wherein the first edge is associated with a first SRLG set and identifying the first edge as a dominating edge includes:
            identifying first disconnecting SRLGs between the source vertex and a first vertex of the first edge;
            identifying second disconnecting SRLGs between the target vertex and a second vertex of the first edge;
            determining a first union of the first SRLG set, the first disconnecting SRLGs, and the second disconnecting SRLGs; and
            determining that removing edges associated with SRLG sets that overlap with the first union disconnects the source vertex and the target vertex; and
    removing the first edge;
identifying two SRLG-disjoint paths on the reduced graph; and
providing instructions to configure the communications network according to the identified two SRLG-disjoint paths.

2. The non-transitory, computer-readable medium of claim 1, wherein:
    identifying the first edge as a dominating edge comprises determining that removing the first edge and the edges dominated by the first edge disconnects the source vertex from the target vertex.

3. The non-transitory, computer-readable medium of claim 2, wherein:
    the first edge dominates a second edge when the first SRLG set associated with the first edge overlaps with a second SRLG set associated with the second edge.

4. The non-transitory, computer-readable medium of claim 1, wherein:
    the first edge is associated with the first SRLG set; and
    identifying the first edge as a dominating edge includes:
        identifying the first disconnecting SRLGs between the source vertex and the first vertex of the first edge;
        identifying the second disconnecting SRLGs between the target vertex and the second vertex of the first edge;
        determining the first union of the first SRLG set, the first disconnecting SRLGs, and the second disconnecting SRLGs; and
        determining that removing edges associated with SRLG sets that overlap with the first union disconnects the source vertex and the target vertex.

5. The non-transitory, computer-readable medium of claim 4, wherein:
    identifying the first edge as a dominating edge further includes:
        identifying third disconnecting SRLGs between the source vertex and the second vertex;
        identifying fourth disconnecting SRLGs between the target vertex and the first vertex;
        determining a second union of the first SRLG set, the third disconnecting SRLGs, and the fourth disconnecting SRLGs; and
        determining that removing edges associated with SRLG sets that overlap with the second union disconnects the source vertex and the target vertex.

6. The non-transitory, computer-readable medium of claim 4, wherein:
    an SRLG is a disconnecting SRLG between two vertices connected by an edge when removing the edge and all edges associated with the SRLG disconnects the two vertices.

7. The non-transitory, computer-readable medium of claim 1, wherein:
    generating the reduced graph further comprises:
        identifying, as a dominating edge, a second edge of the edges remaining after removal of the first edge; and
        removing the second edge.

8. The non-transitory, computer-readable medium of claim 1, wherein:
    the two SRLG-disjoint paths on the reduced graph are identified using an integer linear programming solver.

9. The non-transitory, computer-readable medium of claim 1, wherein:
    the two SRLG-disjoint paths on the reduced graph are identified at least in part by:
        selecting a first path of the two SRLG-disjoint paths;
        identifying all edges dominated by any edge in the first path;
        removing the identified edges from the reduced graph; and
        identifying, using a path-finding algorithm, a second path of the two SRLG-disjoint paths.

10. A method for determining shared risk link group (SRLG) disjoint paths, comprising:
    obtaining a graph representing a communications network, the graph comprising:
        vertices corresponding to nodes in the communication network, the vertices including a source vertex and a target vertex; and
        edges corresponding to communication links in the communication network, each edge associated with an SRLG set; and
    iteratively removing edges from the graph, an iteration comprising:
        identifying a first edge of the edges as a dominating edge:
            wherein identifying the first edge as a dominating edge comprises determining that removing the first edge and edges dominated by the first edge disconnects the source vertex from the target vertex; or
            wherein the first edge is associated with a first SRLG set and identifying the first edge as a dominating edge includes:
                identifying first disconnecting SRLGs between the source vertex and a first vertex of the first edge;
                identifying second disconnecting SRLGs between the target vertex and a second vertex of the first edge;

determining a first union of the first SRLG set, the first disconnecting SRLGs, and the second disconnecting SRLGs; and determining that removing edges associated with SRLG sets that overlap with the first union disconnects the source vertex and the target vertex; and removing the first edge;

identifying two SRLG-disjoint paths on the graph; and providing instructions to configure the communication network according to the identified two SRLG-disjoint paths.

11. The method of claim 10, wherein:

identifying the first edge as a dominating edge comprises determining that removing the first edge and the edges dominated by the first edge disconnects the source vertex from the target vertex.

12. The method of claim 11, wherein:

the first edge dominates a second edge when the first SRLG set associated with the first edge overlaps with a second SRLG set associated with the second edge.

13. The method of claim 11, wherein:

the first edge is associated with the first SRLG set; and identifying the first edge as a dominating edge includes:
identifying the first disconnecting SRLGs between the source vertex and the first vertex of the first edge;
identifying the second disconnecting SRLGs between the target vertex and the second vertex of the first edge;
determining the first union of the first SRLG set, the first disconnecting SRLGs, and the second disconnecting SRLGs; and
determining that removing edges associated with SRLG sets that overlap with the first union disconnects the source vertex and the target vertex.

14. The method of claim 13, wherein:

identifying the first edge as a dominating edge further includes:
identifying third disconnecting SRLGs between the source vertex and the second vertex;
identifying fourth disconnecting SRLGs between the target vertex and the first vertex;
determining a second union of the first SRLG set, the third disconnecting SRLGs, and the fourth disconnecting SRLGs; and
determining that removing edges associated with SRLG sets that overlap with the union disconnects the source vertex and the target vertex.

15. The method of claim 13, wherein:

an SRLG is a disconnecting SRLG between two vertices connected by an edge when removing the edge and all edges associated with the SRLG disconnects the two vertices.

16. The method of claim 11, wherein:

the two SRLG-disjoint paths on the reduced graph are identified using an integer linear programming solver.

17. A system comprising:

at least one processor; and at least one non-transitory, computer-readable medium containing instructions that, when executed by at least one processor of the system, cause the system to perform operations for determining shared risk link group (SRLG) disjoint paths, comprising:

obtaining an original graph representing a communications network, the original graph including:
vertices corresponding to nodes in the communication network, the vertices including a source vertex and a target vertex, and
edges corresponding to communication links in the communications network, each edge associated with an SRLG set; and generating a reduced graph from the original graph, the generation comprising:
identifying a first edge of the edges as a dominating edge, the first edge associated with a first SRLG set, identification of the first edge comprising:
identifying a subset of the edges, the subset including edges associated with SRLG sets that overlap with the first SRLG set, and determining that removing the first edge and the edges in the subset disconnects the source vertex from the target vertex; or
identifying first disconnecting SRLGs between the source vertex and a first vertex of the first edge, identifying second disconnecting SRLGs between the target vertex and a second vertex of the first edge, determining a first union of a first SRLG set of the first edge, the first disconnecting SRLGs, and the second disconnecting SRLGs, and determining that removing edges associated with SRLGs that overlaps with the first union disconnects the source vertex and the target vertex; and
removing the first edge;

identifying two SRLG-disjoint paths on the reduced graph; and providing instructions to configure the communications network according to the identified two SRLG-disjoint paths.

18. The system of claim 17, wherein:

identification of the first edge comprises:
identifying a subset of the edges, the subset including edges associated with SRLG sets that overlap with the first SRLG set; and
determining that removing the first edge and the edges in the subset disconnects the source vertex from the target vertex.

19. The system of claim 17, wherein:

identification of the first edge comprises:
identifying first disconnecting SRLGs between the source vertex and a first vertex of the first edge;
identifying second disconnecting SRLGs between the target vertex and a second vertex of the first edge;
determining a first union of a first SRLG set of the first edge, the first disconnecting SRLGs, and the second disconnecting SRLGs; and
determining that removing edges associated with SRLGs that overlaps with the first union disconnects the source vertex and the target vertex.

20. The system of claim 19, wherein:

generating the reduced graph from the original graph further comprises:
identifying third disconnecting SRLGs between the source vertex and the second vertex;
identifying fourth disconnecting SRLGs between the target vertex and the first vertex;
determining a second union of the first SRLG, the third disconnecting SRLGs, and the fourth disconnecting SRLGs; and
determining that removing edges associated with SRLGs that overlaps with the union disconnects the source vertex and the target vertex.

* * * * *